(12) United States Patent
Wang et al.

(10) Patent No.: US 11,423,107 B2
(45) Date of Patent: Aug. 23, 2022

(54) APPLICATION RECOMMENDATION METHOD AND APPARATUS, AND SERVER

(71) Applicant: TENCENT TECHNOLOGY (SHENZHEN) COMPANY LIMITED, Guangdong (CN)

(72) Inventors: Xing Ya Wang, Shenzhen (CN); Wei Wan, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 366 days.

(21) Appl. No.: 16/550,405

(22) Filed: Aug. 26, 2019

(65) Prior Publication Data

US 2019/0377768 A1 Dec. 12, 2019

Related U.S. Application Data

(63) Continuation of application No. PCT/CN2018/083909, filed on Apr. 20, 2018.

(30) Foreign Application Priority Data

May 11, 2017 (CN) .......................... 201710330671.8

(51) Int. Cl.
*G06F 16/95* (2019.01)
*G06F 16/9536* (2019.01)
(Continued)

(52) U.S. Cl.
CPC ......... *G06F 16/9536* (2019.01); *G06N 20/00* (2019.01); *H04L 51/52* (2022.05)

(58) Field of Classification Search
CPC .... G06Q 50/01; G06F 16/9536; G06N 20/00; H04L 51/52
See application file for complete search history.

(56) References Cited

U.S. PATENT DOCUMENTS 8,180,804 B1 * 5/2012 Narayanan ........ G06F 16/24575
707/798
2011/0307478 A1 * 12/2011 Pinckney ............ G06F 16/9537
707/724
(Continued)

FOREIGN PATENT DOCUMENTS

| CN | 104348714 A | 2/2015 |
| CN | 104951465 A | 9/2015 |
| CN | 105959365 A | 9/2016 |

OTHER PUBLICATIONS

Written Opinion of the International Searching Authority dated Jul. 20, 2018, in International Application No. PCT/CN2018/083909.
(Continued)

*Primary Examiner* — Mohammad S Rostami
(74) *Attorney, Agent, or Firm* — Sughrue Mion, PLLC

(57) ABSTRACT

A method, apparatus and server for recommending an application are provided. The method may include determining at least one target friend among a plurality of friends of a target user, obtaining social interaction characteristics between the target user and the at least one target friend, based on a pre-trained friend impact prediction model of a target application and the social interaction characteristics between the target user and the at least one target friend, determining a first impact of the at least one target friend on registration of the target user in the target application, determining a recommendation score corresponding to the target user and the target application according to the first impact of the at least one target friend on registration of the target user in the target application, and performing application recommendation according to the recommendation score.

16 Claims, 11 Drawing Sheets

(51) Int. Cl.
*G06N 20/00* (2019.01)
*H04L 51/52* (2022.01)

(56) References Cited

U.S. PATENT DOCUMENTS

| | | | | |
|---|---|---|---|---|
| 2012/0116905 | A1* | 5/2012 | Futty | G06F 16/951 |
| | | | | 705/26.1 |
| 2014/0052683 | A1* | 2/2014 | Kirkham | H04L 67/34 |
| | | | | 706/46 |
| 2014/0201681 | A1* | 7/2014 | Mahaffey | H04M 1/72454 |
| | | | | 715/846 |
| 2015/0106350 | A1* | 4/2015 | Cook | G06F 16/951 |
| | | | | 707/706 |
| 2016/0140670 | A1* | 5/2016 | Gupta | G06Q 50/01 |
| | | | | 705/7.29 |
| 2017/0351388 | A1* | 12/2017 | Grunewald | H04W 8/22 |
| 2017/0353603 | A1* | 12/2017 | Grunewald | H04W 4/60 |
| 2018/0213284 | A1* | 7/2018 | Shekhar | H04N 21/4826 |
| 2018/0225306 | A1* | 8/2018 | He | G06Q 50/01 |

OTHER PUBLICATIONS

International Search Report for PCT/CN2018/083909 dated Jul. 20, 2018 [PCT/ISA/210].

* cited by examiner

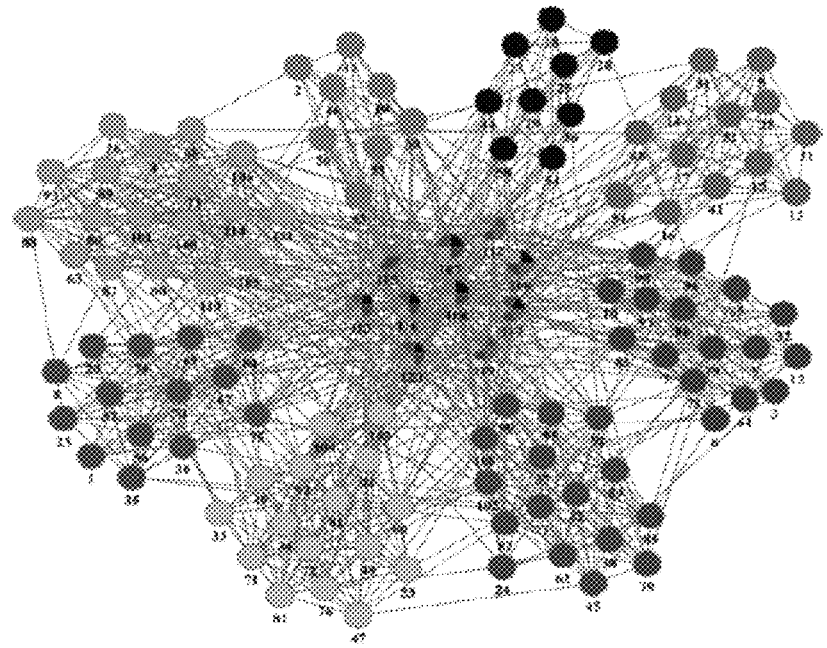

FIG. 12

```
                                                                    S800
┌─────────────────────────────────────────────────────────────┐    /
│  Determine, in friend circles of a target user, at least one │  /\/
│  first friend circle in which group chats are established for│
│  a quantity of times reaching a quantity threshold of times  │
└─────────────────────────────────────────────────────────────┘
                              │                                     S810
                              ▼                                    /
┌─────────────────────────────────────────────────────────────┐  /\/
│     Determine, in group chats established in first friend    │
│   circles, a group chat in which members of a first friend   │
│  circle occupies a proportion greater than a predetermined   │
│                         proportion                           │
└─────────────────────────────────────────────────────────────┘
                              │                                     S820
                              ▼                                    /
┌─────────────────────────────────────────────────────────────┐  /\/
│       Collect a name text of the determined group chat       │
└─────────────────────────────────────────────────────────────┘
                              │                                     S830
                              ▼                                    /
┌─────────────────────────────────────────────────────────────┐  /\/
│ Perform text classification on the name text, and obtain a   │
│               class of the first friend circle               │
└─────────────────────────────────────────────────────────────┘
```

FIG. 13

APPLICATION RECOMMENDATION METHOD AND APPARATUS, AND SERVER

CROSS-REFERENCE TO RELATED APPLICATIONS

This application is a continuation of International Patent Application No. PCT/CN2018/083909 filed on Apr. 20, 2018, which claims priority from Chinese Patent Application No. 201710330671.8, filed in the Chinese Patent Office on May 11, 2017 and entitled "APPLICATION RECOMMENDATION METHOD AND APPARATUS, AND SERVER," the disclosures of which are incorporated herein by reference in their entireties.

BACKGROUND

1. Field

The present disclosure relates to the field of data processing technologies, and specifically to an application recommendation method and apparatus, and a server.

2. Description of Related Art

The number of user applications executable by a terminal device, for example, a smartphone or a personal computer PC has been increasing, and has been developing very rapidly. One of the important features that is in demand is to enable a user to find an application of interest quickly and accurately, and it is increasingly important to perform application recommendation for the user.

An application downloading platform, such as, an application market or an APP store, providing an application downloading service to the user is usually provided with a technique for performing application recommendation. A current mainstream application recommendation technique is mainly to rank applications based on downloading counts of the applications, and preferentially recommend an application having a large quantity of downloads. Although the application recommendation technique based on downloading counts enables the user to find a currently popular application, this application recommendation technique appears relatively undiversified in confrontation with continuously changing application downloading requirements of the user. Therefore, the present disclosure provides a new application recommendation method to enrich application recommendation solutions.

SUMMARY

According to an embodiment, an application recommendation method, the method being performed by a server, and the method includes determining at least one target friend among a plurality of friends of a target user; obtaining social interaction characteristics between the target user and the at least one target friend; based on a pre-trained friend impact prediction model of a target application and the social interaction characteristics between the target user and the at least one target friend, determining a first impact of the at least one target friend on registration of the target user in the target application; determining a recommendation score corresponding to the target user and the target application according to the first impact of the at least one target friend on registration of the target user in the target application; and performing application recommendation according to the recommendation score.

According to another embodiment, there is provided an application recommendation apparatus including at least one memory configured to store computer program code; and at least one processor configured to access the computer program code including friend determining code configured to cause the at least one processor to determine at least one target friend among a plurality of friends of a target user; interaction characteristic obtaining code configured to cause the at least one processor to obtain social interaction characteristics between the target user and the at least one target friend; first impact determining code configured to cause the at least one processor to determine, based on a pre-trained friend impact prediction model of a target application and social interaction characteristics between the target user and the at least one target friend, a first impact of the at least one target friend on registration of the target user in the target application; recommendation score determining code configured to cause the at least one processor to determine a recommendation score corresponding to the target user and the target application according to the first impact of the at least one target friend on registration of the target user in the target application; and recommendation code configured to cause the at least one processor to perform application recommendation according to the recommendation score.

According to another embodiment, there is provided an application recommendation server including at least one memory configured to store computer program code; and at least one processor configured to access the at least one memory and operate according to the computer program code including friend determining code configured to cause the at least one processor to determine at least one target friend among a plurality of friends of a target user; interaction characteristic obtaining code configured to cause the at least one processor to obtain social interaction characteristics between the target user and the at least one target friend; first impact determining code configured to cause the at least one processor to determine, based on a pre-trained friend impact prediction model of a target application and the social interaction characteristics between the target user and the at least one target friend, a first impact of the at least one target friend on registration of the target user in the target application; recommendation score determining code configured to cause the at least one processor to determine a recommendation score corresponding to the target user and the target application according to the first impact of the at least one target friend on registration of the target user in the target application; and recommendation code configured to cause the at least one processor to perform application recommendation according to the recommendation score. Moreover, compared with application recommendation implemented based on a downloading counts, the application recommendation method that is implemented based on an impact of a friend on a user registration to an application may cause a non-hot application to be found by the user based on a social relationship of the user. Thus, the embodiments of the present disclosure improves a probability that an application may be recommended and found, not solely based on popularity of the application. Additionally, compared with application recommendation implemented based on an interest of a user, the embodiments of the present disclosure may remedy a defect that a new user cannot recommend an application based on interest because of insufficient application experience data.

BRIEF DESCRIPTION OF THE DRAWINGS

FIG. 12 is a schematic diagram of a node cluster according to an embodiment.

FIG. 13 is a flowchart of a friend circle classification method according to an embodiment.

DESCRIPTION OF EMBODIMENTS

The present disclosure finds that, a social relationship of a user plays a particular role in whether the user downloads an application. For example, if many friends of a user are using an application, a probability that the user will also use the application under the influence of the friends is enhanced. Moreover, as a social attribute of an application, such as a game, is notably strong. Therefore, it is necessary to provide a new solution for implementing application recommendation based on a social relationship of a user, so as to enrich application recommendation method.

The following describes the technical solutions in the embodiments of the present disclosure with reference to the accompanying drawings. All other embodiments obtained by a person of ordinary skill in the art according to the embodiments of the present disclosure without creative effects shall fall within the protection scope of the present disclosure.

An application recommendation method provided in the embodiments of the present disclosure may be performed by a server, and the server may be a server of an application downloading platform. In the embodiments of the present disclosure, a corresponding program may be installed in the server to implement the application recommendation method provided, and the program may be stored in a memory in the server, and implemented by a processor.

Figure 1:
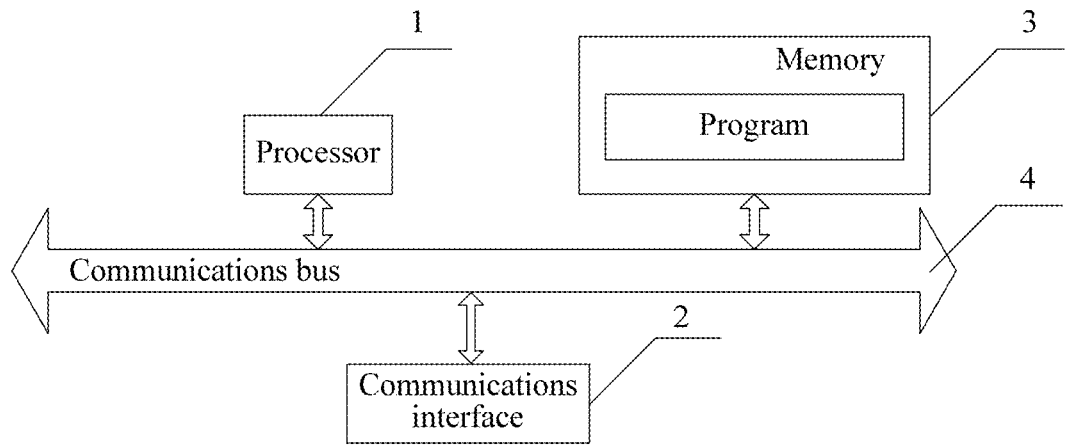
FIG. 1 is a block diagram of a hardware structure of a server according to an embodiment.

FIG. 1 is a block diagram of a hardware structure of a server according to an embodiment. Referring to FIG. 1, the server may include at least one processor 1, at least one communications interface 2, at least one memory 3, and at least one communications bus 4.

According to an embodiment, the processor 1, the communications interface 2, and the memory 3 communicate through the communications bus 4. However, a communication connection of the processor 1, the communications interface 2, the memory 3, and the communications bus 4 shown in FIG. 1 is only an example.

The communications interface 2 may be an interface of a communications module, for example, an interface of a GSM module.

The processor 1 may be a central processing unit CPU, or an application-specific integrated circuit (ASIC), or one or more integrated circuits configured to implement embodiments of the present disclosure.

The memory 3 may include a high-speed RAM memory, or may further include a non-volatile memory, for example, at least one magnetic disk storage.

The memory 3 stores a program, and the processor 1 accesses the program stored in the memory 3 to implement the application recommendation method provided.

From the perspective of the server, the application recommendation method is provided, and content of the application recommendation method may be implemented by a corresponding program installed in the server.

Figure 2:
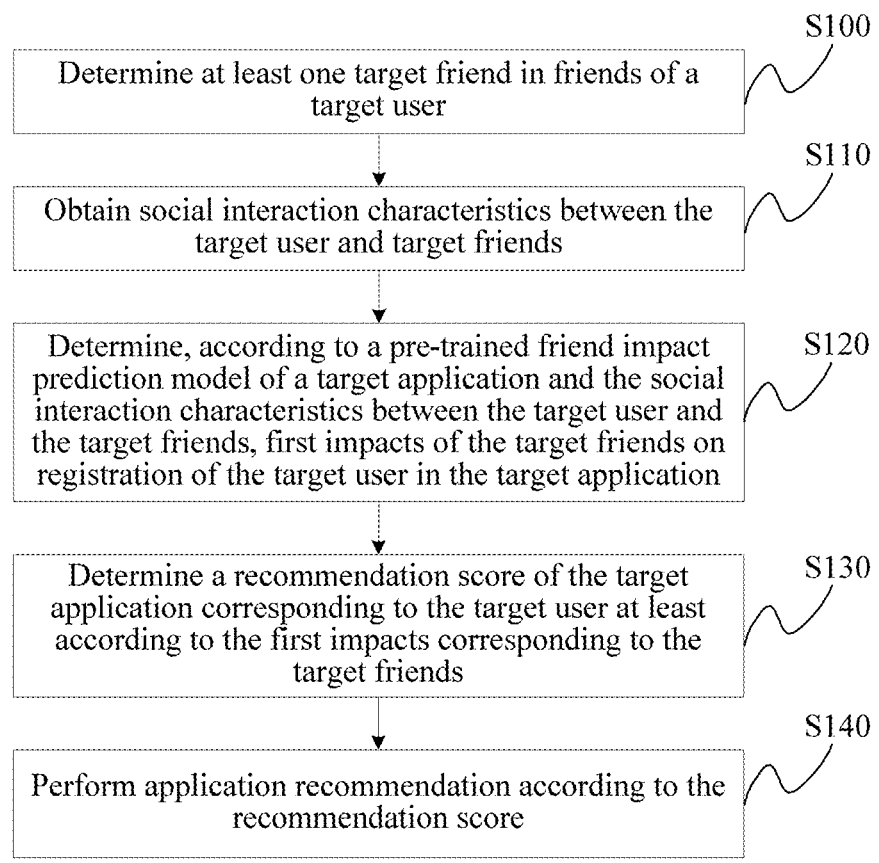
FIG. 2 is a flowchart of an application recommendation method according to an embodiment.

FIG. 2 is a flowchart of an application recommendation method according to an embodiment. The method may be performed by a server. Referring to FIG. 2, the method may include the following steps.

In step S100, the method may determine at least one target friend among a plurality of friends of a target user.

The target user may be a user that application recommendation is directed to, according to an embodiment. For example, each user registered with an application downloading platform may be used as the target user, and an application is recommended for the target user based on the application recommendation method provided.

A friend of the target user may be a user having an intra-set-level friend relationship with the target user, and being one of the application users indicated by a social relationship chain of the target user. In the social relationship chain, the term "level" may be used to measure a friendliness extent between friends. Different levels of friend relationships reflect different friendliness extents. For example, a threshold may be set for a friendliness extent, and a user having a friendliness extent higher than the threshold is determined as a friend of the target user. Further, a threshold may be set for a "level", and a user having a friend relationship with the target user within the set level is determined as a friend of the target user.

A user having a friend relationship with the target user within the set level is a user having an intra-set-level friend relationship with the target user. That is, the intra-set-level friend relationship may include a one-level friend relationship to a set-level friend relationship. For example, if a set level is a three-level, the intra-set-level friend relationship is friend relationship, including a one-level friend relationship, a two-level friend relationship and/or a three-level friend relationship. The set-level friend relationship may be set according to an actual case. For example, if the two-level friend relationship may be set as the set-level friend relationship according to an empirical value, users having the one-level friend relationship and the two-level friend relationship may be determined as friends of the target user. Here, the one-level relationship may refer to a direct friend. In other words, the target user being friend with a target friend on a social application, for example, is one-level relationship. Further, the two-level relationship may refer to a two-tier relationship in which a target friend is friend of a friend. That is, the target user may not necessarily be friended with a person, but the target user's friend may be friended with the person. Accordingly, the next level relationship may use similar analogy as noted above.

Here, the one-level friend relationship may be a direct friend of the target user. For example, a user successfully added by the target user to be in a friend relationship, and a user having the one-level friend relationship with the target user and being in the social relationship chain of the target user is referred to as a one-level friend of the target user.

The two-level friend relationship may be a user (referred to as a two-level friend of the target user) added by a one-level friend of the target user to be in a friend relationship and being in one-level friends of a non-target user indicated by the social relationship chain of the target user, and a definition of the three-level friend relationship, a four-level friend relationship, or the like may be deduced by similar analogy.

The social relationship chain of the target user may be a social relationship of the target user that is indicated in a link form and that corresponds to an application having a friend adding function, such as a social application. The server to which the method shown in FIG. 2 is applied may access data of a server of a social application to obtain social data, such as a social relationship chain of users provided by the social application.

Figure 3:
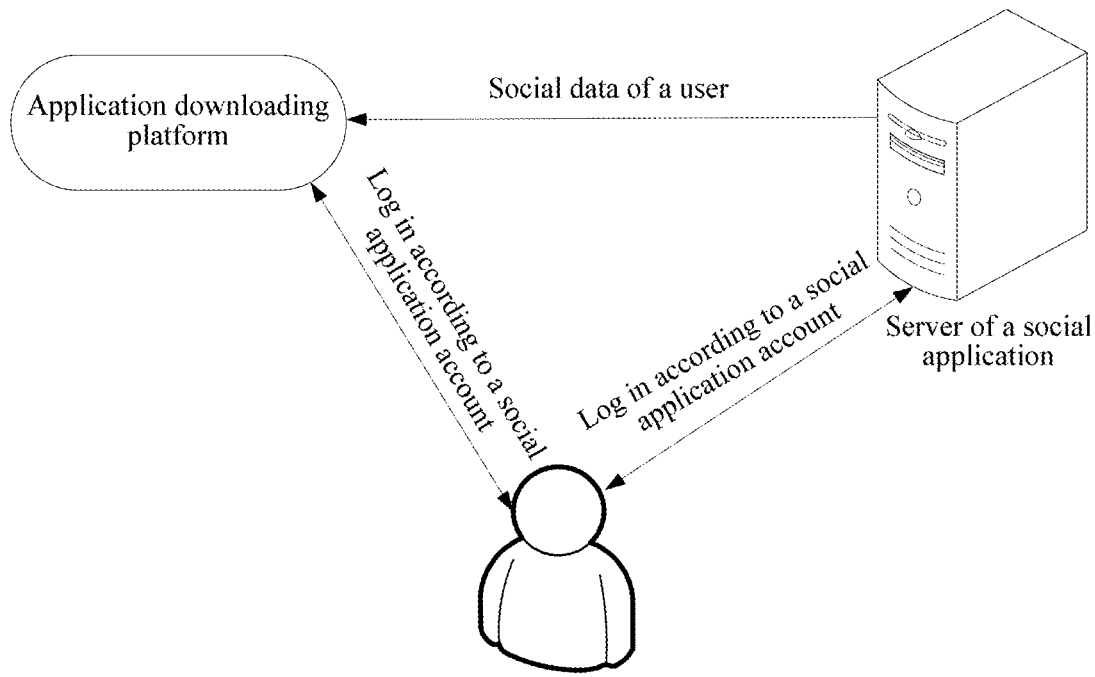
FIG. 3 is a schematic diagram of obtaining social data according to an embodiment.

Additionally, the server to which the method shown in FIG. 2 is applied may share an account system with the server of the social application. For example, as shown in FIG. 3, a user may log in to an application downloading platform through a social application account, and the application downloading platform may obtain social data of the user from the server of the social application through the social application account of the user.

Further, the target friend may be determined among the plurality of friends of the target user may be a friend registered with the target application. In case the friend registered with the target application is one of the friends of the target user, the target application may be any application to be recommended. Alternatively, a friend of the target user may be directly determined as a target friend and a threshold for defining the target friend may be adjusted according to different implementations of the application recommendation method provided according to an embodiment.

In step S110, the method may obtain social interaction characteristics between the target user and target friends.

The social interaction characteristics mentioned in this embodiment may include a quantity of social interactions, social behaviors belonging to a different set social interaction behavior types, and social interaction between two friends within a set interaction period.

For example, the set social interaction behavior type may include at least one behavior type, such as information reception/transmission, video chat, voice chat, status comment, and liking. According to an embodiment, a quantity of information reception/transmission times, a quantity of video chat times, a quantity of voice chat times, a quantity of status comments, a quantity of liking, and the like between two friends may be extracted from social data between the two friends within a set interaction period (for example, a month or a specific time value adjusted according to an actual need), to form social interaction characteristics between the two friends. That is, the data of set social interaction behavior types between two friends within a set interaction period may be quantized, and form a social interaction characteristic between the two friends.

Referring to Table 1 provided below, it shows an example of a social interaction characteristic between two friends. For example, x1 indicates a quantity of communication information reception/transmission, x2 indicates a quantity of video chat, x3 indicates a quantity of voice chat, x4 indicates a quantity of status comments, and x5 indicates a quantity of likes.

TABLE 1

| Quantity x1 of information reception/ transmission | Quantity x2 of video chat | Quantity x3 of voice chat | Quantity x4 of status comment | Quantity x5 of liking |
|---|---|---|---|---|
| 100 | 200 | 100 | 165 | 20 |

In an embodiment, each target friend of the target user needs to obtain a social interaction characteristic between the target user and the target friend.

In step S120, the method may determine, according to a pre-trained friend impact prediction model of a target application and the social interaction characteristics between the target user and the target friends, first impacts of the target friends on registration of the target user in the target application.

The target application is an application to be recommended. In an embodiment, each application to-be-recommended may be used as a target application. Thereafter, processing may be performed according to the method shown in FIG. 2. Friend impact prediction models corresponding to different applications may be different. Nonetheless, a type of the target application is not limited to embodiments of the present disclosure, and the target application may be any type of application providing an application downloading service in the application downloading platform. For example, the target application may include a game type application or a video type application.

The friend impact prediction model of the target application is a prediction model trained in advance according to a machine learning method in an embodiment. An impact of the target friend on registration of the target user in the target application may be determined based on the social interaction characteristic between the target user and the target friend, and the friend impact prediction model of the target application may be obtained through training according to a social interaction characteristic between a friend having registered in the target application and a friend not having registered in the target application.

Specifically, a social interaction characteristic of a friend having registered in the target application may be used as a positive sample characteristic, and a social interaction characteristic of a friend having not registered in the target application may be used as a negative sample characteristic, thereby training the positive sample characteristic and the negative sample characteristic through the machine learning algorithm to obtain a friend impact prediction model of the target application.

For a target friend of the target user, an impact of the target friend on registration of the target user in the target application may be determined according to the friend impact prediction model of the target application, and the social interaction characteristic between the target user and the target friend. For example, processing may be performed for each target friend of the target user, and impacts of target friends on registration of the target user in the target application may be determined to obtain first impacts corresponding to the target friends. The first impact of a target friend mentioned herein is an impact of the target friend on registration of the target user in the target application, and may be indicated in a value form.

In step S130, the method may determine a recommendation score corresponding to the target user and the target application according to the first impacts of the target friends on registration of the target user in the target application.

For example, if each target friend of the target user is a friend having registered in the target application, the first impacts corresponding to the target friends may be added, and a sum of the impacts of the target friends may be obtained by adding each result, thereby determining the recommendation score of the target application corresponding to the target user according to the sum of the impacts of the target friends.

Alternatively, if friends of the target user are directly determined as target friends, the target friends may include a friend having not registered in the target application. According to an embodiment, scoring thresholds may be set for the target friends based on whether the target friends have registered in the target application. The first impact corresponding to the target friend and the corresponding scoring threshold may be multiplied, and each multiplied result may be added for all the first impacts to obtain a sum of the impacts of the target friends, which is a recommendation score of the target application corresponding to the target user according to the sum of the impacts of the target friends.

If a target friend has registered in the target application, a corresponding scoring threshold may be a first value, for example, 1 (a specific value may be set according to an actual case). Conversely, if a target friend has not registered in the target application, a corresponding scoring threshold may be a second value, for example, 0 (a specific value may be set according to an actual case).

After the sum of the impacts of the target friends is obtained, the sum of the impacts of the target friends may be used as the recommendation score corresponding to the target user and the target application according to an embodiment. If another social attribute, for example, a friend circle, of the target user is combined, the sum of the impacts of the target friends may be further combined with an impact of the another social attribute of the target user, thereby determining the recommendation score corresponding to the target user and the target application.

In step S140, the method may perform application recommendation according to the recommendation score.

For example, a corresponding recommendation score may be determined through the method shown in FIG. 2 for each application to be recommended to the target user, thereby ranking each application according to recommendation scores of applications, and application recommendation is performed for the target user according to the ranked applications.

Furthermore, after the recommendation score of the target user is determined, a recommendation rank of a target application may be determined in at least one application recommended to the target user, and recommend the target application to the target user according to this recommendation rank. Specifically, a top-ranked target application may be recommended to the target user based on the ranking result. For example, recommendation scores of 10 target applications may be respectively calculated and ranked according to the recommendation scores in descending order, and the top three target applications may be recommended to the user.

According to an embodiment, in addition to a target application being recommended to a user from the user's perspective, users to which the application is recommended may be further determined from the application's perspective. That is, the server may rank a plurality of target users according to a user recommendation score corresponding to the target application, and recommend the target application to a top-ranked target user according to a user ranking result. For example, recommendation scores of 100 users corresponding to the application may be calculated, and ranking may be performed according to the recommendation scores in descending order. Based on the rankings of the users, users ranked at top 10 may be determined, and then the application may be recommended to those top 10 ranked users.

According to an embodiment, the first impacts of the target friends of the target user on registration of the target user in the target application may be determined based on the social relationship of the target user and based on the pre-trained friend impact prediction model of the target application. The recommendation score corresponding to the target user and the target application may be determined according to the first impacts corresponding to the target friends, and application recommendation may be performed according to the recommendation score. Thus, the application recommendation based on the social relationship of the target user may enrich application recommendation solutions.

Moreover, compared to an application recommendation implemented based on a downloading counts, the application recommendation method implemented based on an impact of a friend on a user registration of an application enables the user to find less popular applications because the recommendations are made based on a social relationship of the user, thereby increasing a probability that the user will download the recommended application. Additionally, compared to an application recommendation implemented based on an interest of a user, the application recommendation method implemented based on an impact of a friend on a user registration of an application may remedy a defect of a new user not being able to recommend an application based on an interest because of insufficient application experience data. Thus, the embodiments of the present disclosure increases a probability that user will download the recommended application.

Figure 4:
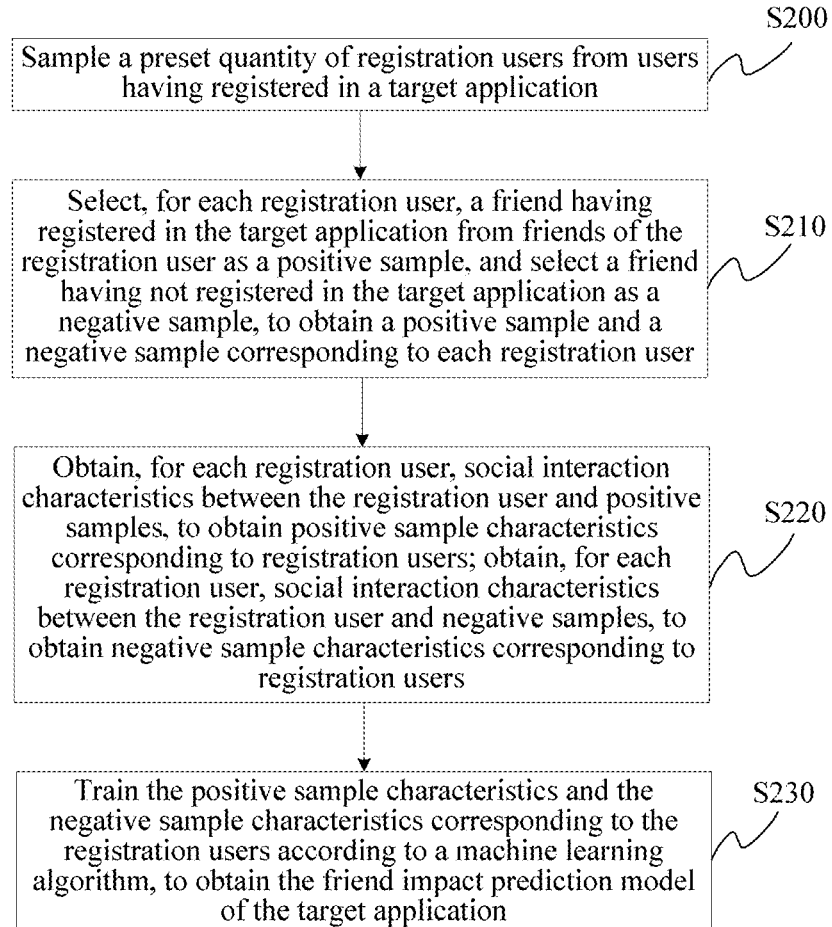
FIG. 4 is a flowchart of training a friend impact prediction model according to an embodiment.

FIG. 4 shows a process of training a friend impact prediction model of a target application. Each application to-be-recommended may be used as a target application, and a friend impact prediction model corresponding to each application to-be-recommended is trained according to a method shown in FIG. 4. Referring to FIG. 4, the method may be performed by a server, and may include the following steps.

In step S200, the method may sample a preset quantity of registration users from users having registered in a target application.

According to an embodiment, the users having registered in the target application may be determined at an initial operating stage of the target application. The initial operating stage of the target application may be within a particular time after the target application is launched. For example, a specific time value of the particular time may be adjusted in accordance with different cases, and the particular time is usually considered as time in which a user quantity has not been saturated. Further, a preset quantity indicating a number of registered users sampled from the users. A sampling manner may be selected according to an actual need. For example, a uniform sampling manner may be performed according to geographic locations, different registration times, age groups, and so on.

In step S210, the method may select, for each registration user, a friend registered with the target application among a plurality of friends as a positive sample. Conversely, the method may select a friend not registered with the target application as a negative sample. Thus, for each registration user, a positive sample and a negative sample may be obtained.

For each sampled registration user, friends of the registration user may be determined according to a social relationship chain of the registration user.

The friends of the registration user may be users having an intra-set-level friend relationship with the registration user and may be users identified by the social relationship chain of the registration user. The concept may be similar to that in step S100 shown in FIG. 2, and mutual reference may be made.

In addition, one registration user may correspond to at least one positive sample, and may correspond to at least one negative sample.

For example, an occasion of selecting a positive sample and a negative sample of a registration user may be time within a set observation period after the registration user has registered in the target application. The set observation period is, for example, time within a month after the registration user has registered in the target application, and a specific period value may be adjusted according to an actual need. Further, for each registration user, a friend having registered in the target application among a plurality of friends of the registration user may be used as a positive sample within the set observation period after the registration user has registered in the target application, and a friend having not registered in the target application is used as a negative sample.

Referring to Table 2 provided below, an example of a positive sample and a negative sample of a sampled registration user are shown.

TABLE 2

| Registration user | Friend of the registration user | Whether to register in a target application within an observation period | Type of sample to the registration user |
|---|---|---|---|
| | A | Yes | Positive sample |
| | B | No | Negative sample |
| | C | Yes | Positive sample |
| | D | No | Negative sample |

In step S220, the method may obtain, for each registration user, social interaction characteristics between the registration user and positive samples, to obtain positive sample characteristics corresponding to registration users. The method may also obtain, for each registration user, social interaction characteristics between the registration user and negative samples, to obtain negative sample characteristics corresponding to registration users.

The social interaction characteristic may include a quantity of social interaction behaviors belonging to a set social interaction behavior type and interactions between two friends within a set interaction period.

According to an embodiment, for each registration user, a quantity of social interaction behaviors belonging to a set social interaction behavior type within a set interaction period and interactions between the registration user and corresponding positive samples may be determined, and social interaction characteristics between the registration user and corresponding positive samples may be obtained, to obtain a positive sample characteristic corresponding to the registration user. Therefore, the method may obtain, for each registration user, positive sample characteristics corresponding to registration users.

Specifically, a set of social interaction behavior types may be selected by ranking information gains of characteristics of various types of social interaction behaviors. That is, characteristics may be obtained after quantities of the various types of social interaction behaviors are quantized, and selecting, according to values of the information gains, a set quantity of types of social interaction behaviors based on a threshold value of information gain. For example, characteristics of various types of social interaction behaviors between a registration user and a friend may be determined, then information gains of the characteristics of the various types of social interaction behaviors may be determined. The characteristics of the various types of social interaction behaviors may be ranked according to values of the information gains, and a set quantity of types of social interaction behaviors whose characteristic has a maximum information gain are selected as set social interaction behavior types.

The following descriptions are merely an example to describe one of the embodiments herein. A social application, such as WeChat, includes five types of social interaction behaviors: information reception/transmission, video chat, voice chat, status comment, and liking. After social interaction behavior characteristics are obtained by quantizing behavior quantities of the five types of social interaction behaviors, information gains of the types of social interaction behaviors may be calculated, and the information gains may be ranked so that social interaction behavior types ranked at top 3 are selected as set social interaction behavior types. For example, the information gains may be ranked in the following order: video chat, voice chat, information reception/transmission, status comment, and liking in descending order to be used as the user's social interaction behavior types.

Alternatively, set social interaction behavior types may be all set types of social interaction behaviors. However, a manner of selecting all set types of social interaction behaviors may have a problem of a relatively large data processing amount, and other aspects have relatively small differences from the foregoing selection of set social interaction behavior types through information gains.

In step S230, the method may train the positive sample characteristics and the negative sample characteristics corresponding to the registration users according to a machine learning algorithm, to obtain the friend impact prediction model of the target application.

After the positive sample characteristics and the negative sample characteristics corresponding to the registration users are obtained, training may be performed by using the machine learning algorithm to obtain a training result, that is, the training is performed to obtain the friend impact prediction model of the target application. The friend impact prediction model of the target application may predict a first impact of a friend of a user on registration of the user in the target application, and the first impact may be indicated as a value.

Further, adjustment may be made according to an actual case, and a type of machine learning algorithm may be selected. For example, a machine learning algorithm using a linear model, in which a corresponding friend impact prediction model using weights of set social interaction behavior types, may be selected. As another example, a machine learning algorithm using a tree classifier, such as a decision tree, may be selected. As yet another example, a machine learning algorithm using a support vector machine may be selected.

In a training process, a prediction effect of a friend impact prediction model may be inspected in a manner, such as cross validation, overfitting, and the like, to attenuate errors in the friend impact prediction model.

After the friend impact prediction model of the target application is obtained, step S120 may be performed. That is, first impacts of the target friends on registration of the target user in the target application may be determined according to a pre-trained friend impact prediction model of a target application and the social interaction characteristics between the target user and the target friends. For example, the social interaction characteristics between the target user and the target friends are respectively input to the friend impact prediction model. Based on the input, the pre-trained friend impact prediction model determines the first impacts of the target friends of the target user on registration of the target user in the target application.

For example, a quantity of social interaction behaviors belonging to a set social interaction behavior type within a set interaction period between the target user and the target friend may be obtained. Upon obtaining the quantized social interaction characteristic between the target user and the target friend, a first impact corresponding to the social interaction characteristic may be determined according to the friend impact prediction model, and the first impact indicates an impact of the target friend on registration of the target user in the target application.

For example, using the linear-model machine learning algorithm, the friend impact prediction model may be obtained based on training corresponding to weights of set social interaction behavior types. For a target friend of the target user, a quantity of social interaction behaviors belonging to a set social interaction behavior type within a set interaction period between the target user and the target friend may be combined with a weight of a corresponding social interaction behavior type indicated by the friend impact prediction model, and a first impact of the target friend on registration of the target user in the target application may be determined according to a combination result.

Referring to the Equation (1) provided below, ui denotes a weight of a social interaction behavior type xi. An impact F of a friend of a target user on registration of the target user in a target application may be calculated by using the following formula (1), where b is a constant:

$$F = \frac{1}{1 + e^{-\sum xi*ui + b}} \quad (1)$$

As such, a friend impact prediction model may be determined by the foregoing formula (1). The friend impact prediction model may preset ui. After a social interaction characteristic between the target user and a target friend is input to the friend impact prediction model, the friend impact prediction model may calculate, based on the formula (1), and with reference to the social interaction characteristic and a corresponding weight, a value of a first impact of the friend on registration of the target user in the target application. The value of the first impact of the friend may be used as a prediction result of the friend impact prediction model for the first impact.

According to an embodiment, the method may determine a recommendation score corresponding to the target user and the target application based on the first impacts of the target friends on registration of the target user in the target application. The recommendation scores may differ for different target users because the social interaction between the target user and the other target friend will likely differ.

Figure 5:
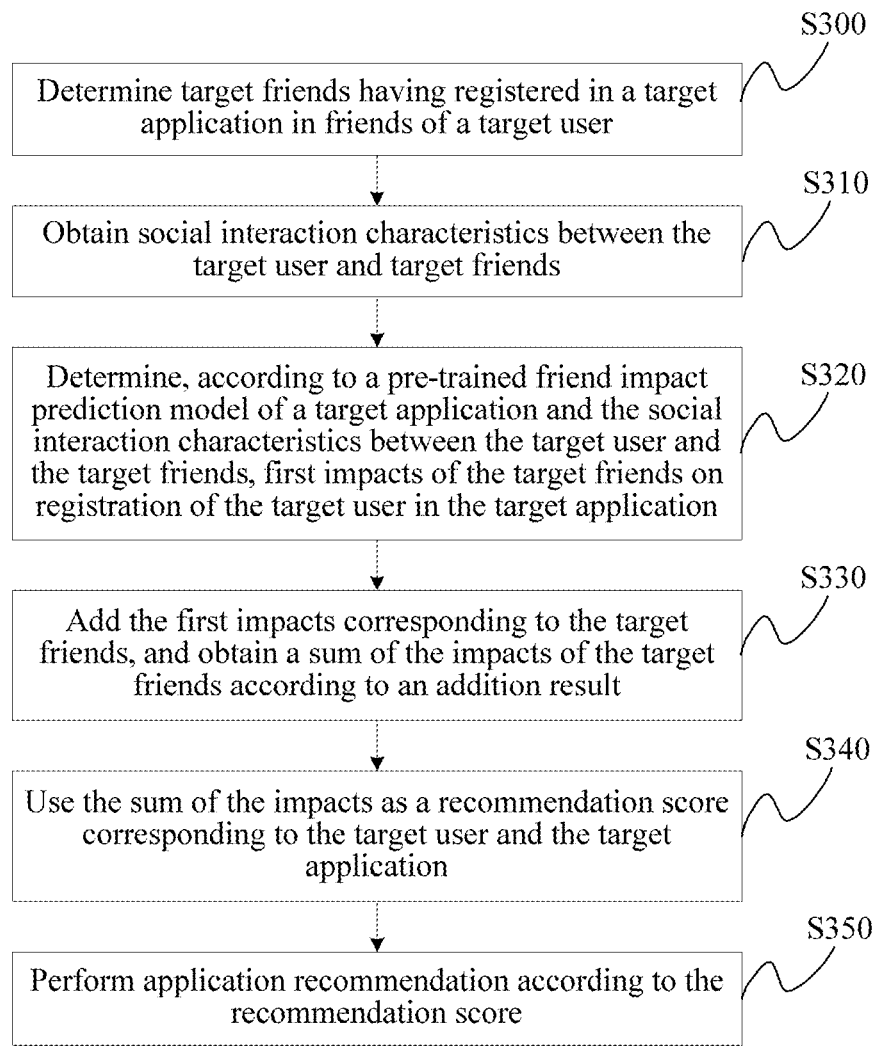
FIG. 5 is another flowchart of an application recommendation method according to an embodiment.

FIG. 5 is another flowchart of an application recommendation method according to an embodiment. The method may be performed by a server. Referring to FIG. 5, the method may include the following steps.

In step S300, the method may determine target friends having registered in a target application among a plurality of friends of a target user.

In step S310, the method may obtain social interaction characteristics between the target user and the target friends.

In step S320, the method may determine, according to a pre-trained friend impact prediction model of the target application and the social interaction characteristics between the target user and the target friends, impacts of the target friends on registration of the target user in the target application, to obtain first impacts corresponding to the target friends.

In step S330, the method may add together the first impacts of the target friends, and obtain a sum of the impacts of the target friends.

After each first impact corresponding to each target friend are added together, the addition result and a set first initial value may be multiplied to obtain the Fsum of the impacts of the target friends.

Assuming that N target friends, among the friends of the target user, have registered in the target application, where $i \in N$, and i indicates an $i^{th}$ target friend, the sum Fsum of the impacts of the target friends may be calculated based on the following formula (2):

$$Fsum = \sum_{i=1}^{N} Fi \quad (2)$$

where Fsum indicates the sum of the impacts of the N target friends, Fi indicates a first impact of a target friend i of the target user on registration of the target user in the target application.

In step S340, the method may use the sum of the impacts as a recommendation score corresponding to the target user and the target application.

In step S350, the method may perform application recommendation according to the recommendation score.

FIG. 5 shows a case in which the target friend is a friend having registered in the target application of the friends of the target user. For example, a friend of the target user may be directly used as a target friend, and a processing method is subsequently adjusted to implement application recommendation.

Figure 6:
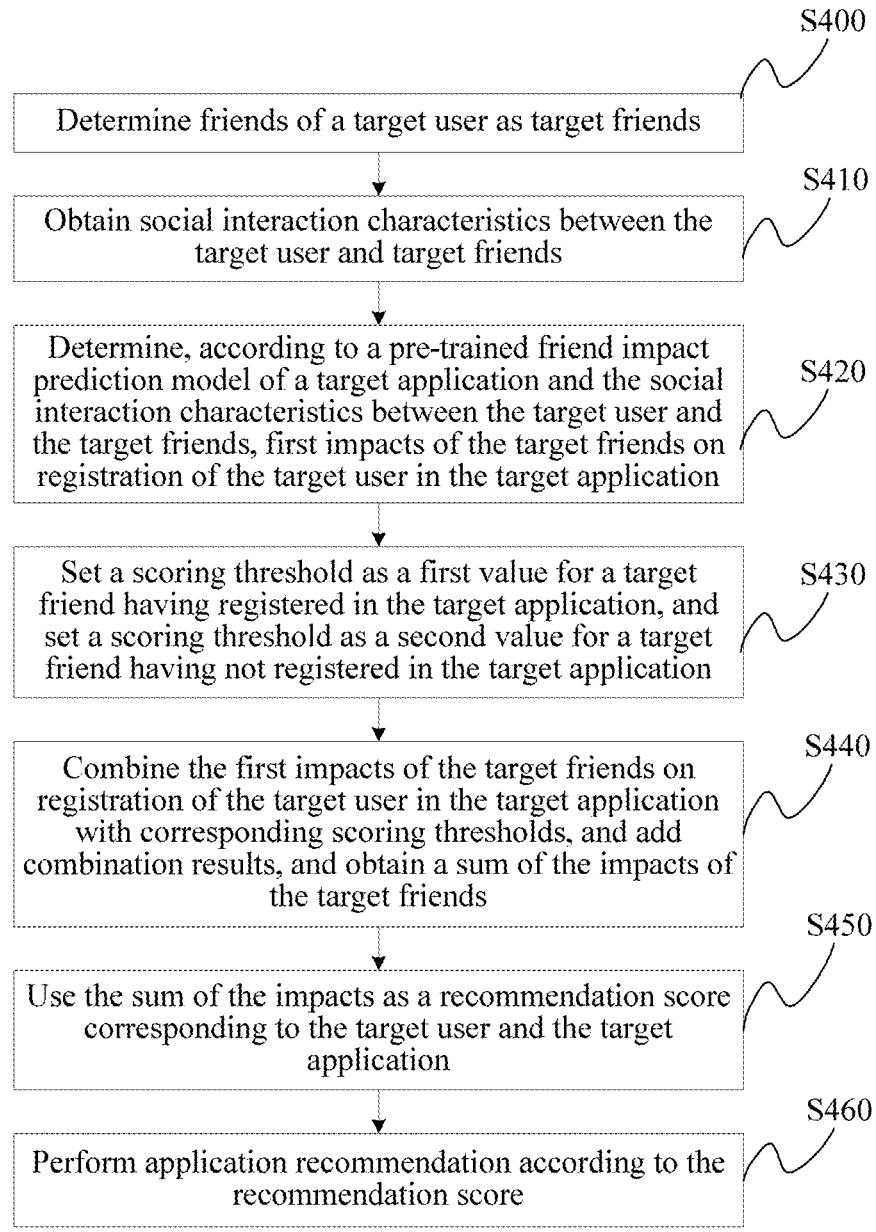
FIG. 6 is still another flowchart of an application recommendation method according to an embodiment.

FIG. 6 is still another flowchart of an application recommendation method according to an embodiment. The method may be performed by a server. Referring to FIG. 6, the method may include the following steps.

In step S400, the method may determine friends of a target user as target friends.

In step S410, the method may obtain social interaction characteristics between the target user and the target friends.

In step S420, the method may determine, according to a pre-trained friend impact prediction model of a target application and the social interaction characteristics between the target user and the target friends, first impacts of the target friends on registration of the target user in the target application.

In step S430, the method may set a scoring threshold as a first value for a target friend having registered in the target application, and set another scoring threshold as a second value for a target friend having not registered in the target application.

Specifically, a scoring threshold flagi may be set for a target friend i, where if the target friend i has registered with the target application, flagi is the first value (for example, 1); or if the target friend i has not registered in the target application, flagi is the second value (for example, 0).

In step S440, the method may combine the first impacts of the target friends on registration of the target user in the target application with corresponding scoring thresholds.

The first impacts of the target friends on registration of the target user in the target application and a corresponding scoring threshold may be multiplied, and then add the multiplied results to obtain a sum of the impacts of the target friends. However, if a target friend has not registered in the target application, and a corresponding scoring threshold is the second value 0, an impact of the target friend on registration of the target user in the target application may be eliminated.

Assuming that there are N target friends of the target user, where i∈N, a sum of impacts of the target friends may be calculated based on the following formula (3):

$$Fsum = \sum_{i=1}^{N} (Fi * flagi) \quad (3)$$

where Fsum indicates a sum of impacts of the target friends on registration of the target user in the target application, Fi indicates a first impact of a target friend i of the target user on registration of the target user in the target application, and flagi indicates a scoring threshold of the target friend i.

In step S450, the method may use the sum of the impacts as a recommendation score corresponding to the target user and the target application.

In step S460, the method may perform application recommendation according to the recommendation score.

The sum of the impacts of the target friends may be determined according to the first impacts corresponding to the target friends. For different target friends, a method for determining the sum of the impacts of the target friends may be adjusted in the methods shown in FIG. 5 and FIG. 6, so that the method may determine the recommendation score of the target application corresponding to different target users.

In addition to directly using the sum of the impacts of the target friends as the recommendation score corresponding to the target user and the target application, the recommendation score corresponding to the target user and the target application may be further determined with reference to another social attribute of the target user, for example, a friend circle.

While significantly improving user experience in terms of deciding which application to download, an inter-friend impact may not be a complete assessment of social interactions. Although social interaction behaviors between some types of friends, such as "colleagues" are may be meaningful, offline communications may have more crucial impact on the target user's decision to download an application. According to types of relationship between friends, the friends may be classified into classmates, friends, relatives, colleagues, and other contacts in which a friend relationship is established according to a work or life affair. Different friend types may have different impacts on the user. Additionally, a difference between interaction patterns of friends, such as information reception/transmission, voice/video chat, mutual reposting, or liking also causes inter-friend impacts to be different. Moreover, historical application data of a friend may also play a quite good verification role for a friend's impact. However, different types of applications are popular in different circles. For example, different games are suitable to be popular in different friend circles, some game may be suitable to be experienced by colleagues together after work, and some game may be popular in a circle having a certain common interest.

Accordingly, an impact of a friend circle on registration of the target user in the target application may be further determined by determining the friend circle of the target user, and then combining with an impact of a target friend of the target user, to determine the recommendation score corresponding to the target user and the target application.

Figure 7:
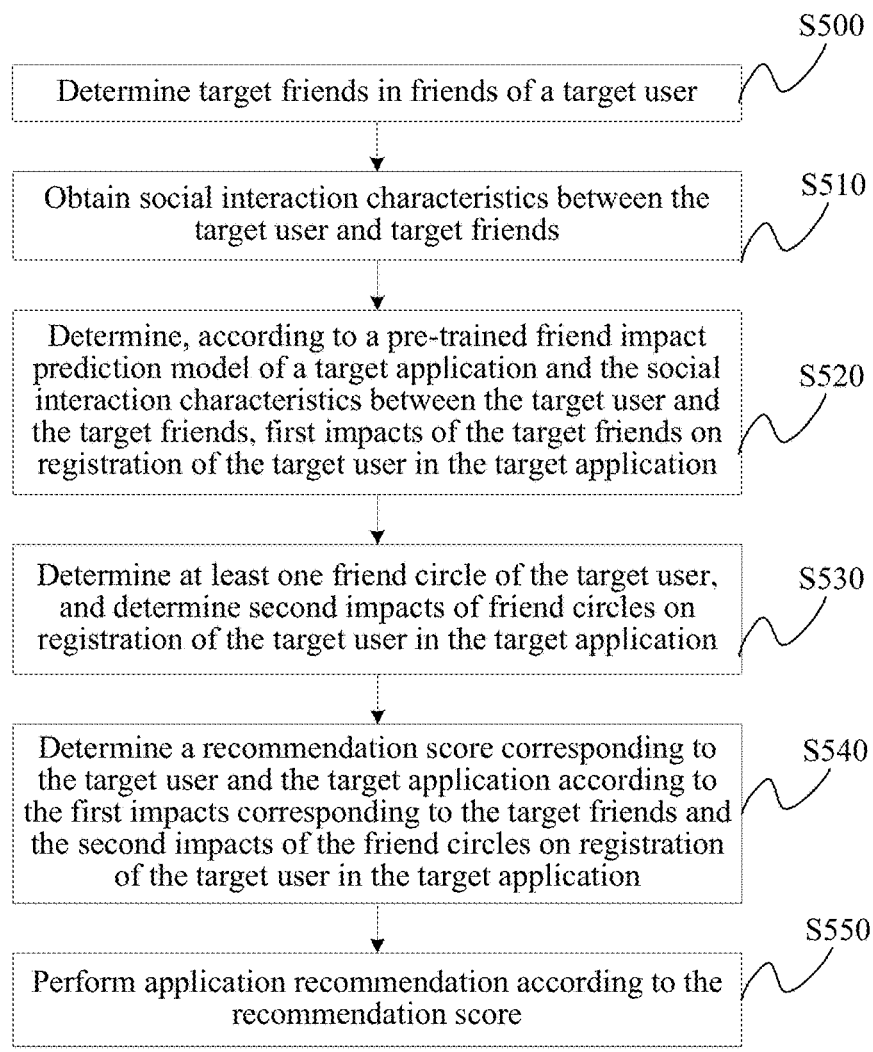
FIG. 7 is yet another flowchart of an application recommendation method according to an embodiment.

FIG. 7 is another flowchart of an application recommendation method according to an embodiment. The method may be performed by a server. Referring to FIG. 7, the method may include the following steps.

In step S500, the method may determine target friends among a plurality of friends of a target user.

In step S510, the method may obtain social interaction characteristics between the target user and the target friends.

In step S520, the method may determine, according to a pre-trained friend impact prediction model of a target application and the social interaction characteristics between the target user and the target friends, first impacts of the target friends on registration of the target user in the target application.

In step S530, the method may determine at least one friend circle of the target user, and determine second impacts of the at least one friend circle on registration of the target user in the target application.

It should be further noted that, an order of determining the first impact and the second impact is not limited to this embodiment. That is, S520 and S530 may be performed simultaneously, or may be performed in an order. For example, S530 may be first performed, and then S520.

In step S540, the method may determine a recommendation score corresponding to the target user and the target application according to the first impacts of the target friends on registration of the target user in the target application and the second impacts of the friend circles on registration of the target user in the target application.

Further, a sum of impacts of the target friends may be determined according to the first impacts of the target friends on registration of the target user in the target application, and a sum of impacts of the friend circles on registration of the target user in the target application may be determined according to the second impacts of the friend circles on registration of the target user in the target application. Then, the sum of the impacts of the target friends and the sum of the impacts of the friend circles on registration of the target user in the target application may be added to obtain a recommendation score corresponding to the target user and the target application.

Compared to the method shown in FIG. 1, FIG. 7 further determines at least one friend circle of the target user, and determines second impacts of friend circles on registration of the target user in the target application, so that when the recommendation score corresponding to the target user and the target application is determined, the recommendation score may be determined according to the first impacts corresponding to the target friends and the second impacts of the friend circles on registration of the target user in the target application.

In step S550, the method may perform application recommendation according to the recommendation score.

According to an embodiment, after the friend circles of the target user are determined, for any friend circle of the target user, a second impact of the friend circle on registration of the target user in the target application may be determined through a quantity of friends in the friend circle that have registered in the target application, and corresponding friend objects in the friend circle.

Figure 8:
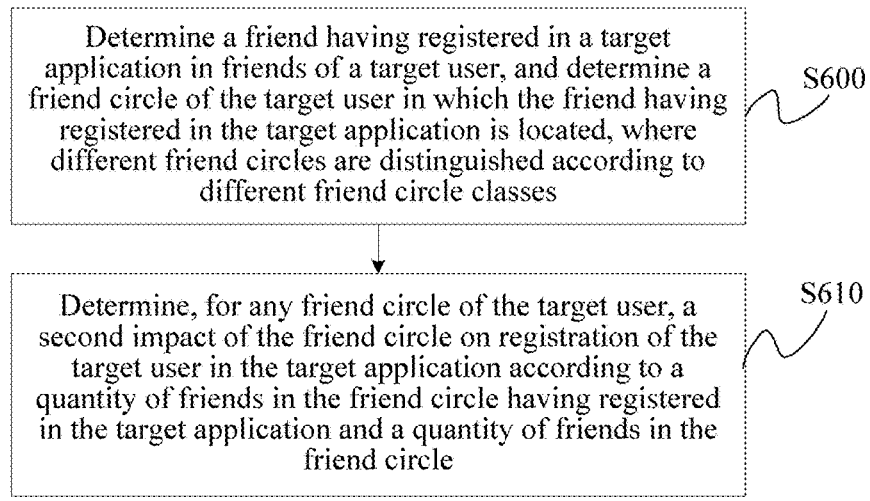
FIG. 8 is a flowchart of a method for determining an impact of a friend circle on registration of a target user in a target application according to an embodiment.

FIG. 8 is a flowchart of a method for determining a second impact of a friend circle on registration of a target user in a target application according to an embodiment. The method may be performed by a server. Referring to FIG. 8, the method may include the following steps.

In step S600, the method may determine a friend having registered in a target application among a plurality of friends of a target user, and determine a friend circle of the target user in which the friend having registered in the target application may be located. Further, the method may distinguish different friend circles according to different friend circle classes.

For each friend of the target user, whether the friend has registered in the target application may be assessed. For the friends having registered in the target application, friend circles of the target user in which the friends having registered in the target application are located may be respectively assessed, and different friend circles may be distinguished according to different friend circle classes.

For example, friends having registered in the target application of the friends of the target user may be assessed within a particular time, for example, within a month, after the target application is launched, and friend circles of the target user in which friends having registered in a game are located are determined.

In step S610, the method may determine, for any friend circle of the target user, a second impact of the friend circle on registration of the target user in the target application according to a quantity of friends in the friend circle having registered in the target application and a quantity of friends in the friend circle.

For any friend circle of the target user, all users other than the target user may be considered as friends of the target user. The friends of the target user may be classified into friends having registered in the target application and friends having not registered in the target application. Further, a second impact of the friend circle on registration of the target user in the target application may be determined according to a quantity of friends in the friend circle that have registered in the target application and a quantity of friends in the friend circle.

Specifically, a manner of calculating a second impact of a friend circle on registration of the target user in the target application are described herein.

A quantity of friends in the friend circle that have registered in the target application is divided by a quantity of friends in the friend circle.

For example, a friend circle may include 10 members in total, and a target user is one of the 10 members, therefore, a quantity of target friends in the friend circle is 9. If six of the nine target friends have registered in a target application, an impact of the friend circle on registration of the target user in the target application is 6/9, that is, 0.67.

After the second impacts of the friend circles on registration of the target user in the target application are obtained, each of the second impact of the friend circles on registration of the target user in the target application may be added to obtain a sum of the impacts of the friend circles on registration of the target user in the target application. And then, the sum of the impacts of the target friends and the sum of the impacts of the friend circles on registration of the target user in the target application may be added to obtain the recommendation score of the target application corresponding to the target user.

For example, assuming that the target user has M friend circles, and j∈M, where j is a $j^{th}$ friend circle of the target user, a sum Gsum of impacts of the friend circles on registration of the target user in the target application may be calculated based on the following formula (4):

$$Gsum = \sum_{j=1}^{M} Gj \quad (4)$$

where Gsum is a sum of all impacts of friend circles of the target user on registration of the target user in the target application, and Gj is a second impact of a friend circle j of the target user on registration of the target user in the target application.

Correspondingly, a formula of calculating the recommendation score corresponding to the target user and the target application may be shown in a formula (5):

$$S = \partial * \sum_{i=1}^{N} (Fi * flagi) + \beta * \sum_{j=1}^{M} Gj \quad (5)$$

where S indicates the recommendation score corresponding to the target user and the target application, Fi indicates a first impact of an $i^{th}$ target friend on registration of the target user in the target application may be calculated according to the formula (1), flagi indicates a scoring threshold of the $i^{th}$ target friend, Gj indicates a second impact of a $j^{th}$ friend circle on registration of the target user in the target application, ∂ is a first initial value representing a weight of a friend impact, and β is a second initial value representing a weight of a friend circle impact.

Furthermore, for the set first initial value ∂ and the set second initial value β, values of ∂ and β may be updated by using registration rates recommended through a friend circle and/or a friend. Usually, if it is determined that a registration rate recommended through a friend circle is relatively higher, it may be determined that the friend circle impact is more important, and the second initial value β of the friend circle impact may be increased so that it gives more weight to the friend circle impact. If a registration rate recommended through a friend is relatively higher, it may be determined that a friend impact is more important, and a first initial value ∂ of the friend impact may be increased so that it gives more weight to the friend impact. Therefore, ∂ and β may be correspondingly updated according to a registration rate feedback of a user.

In addition, friend circles of the target user may be a plurality of friend circles that the target user may autonomously set, and friends in the friend circles may be defined so that the friend circles of the target user may be found based on the friends of the target user.

Figure 9:
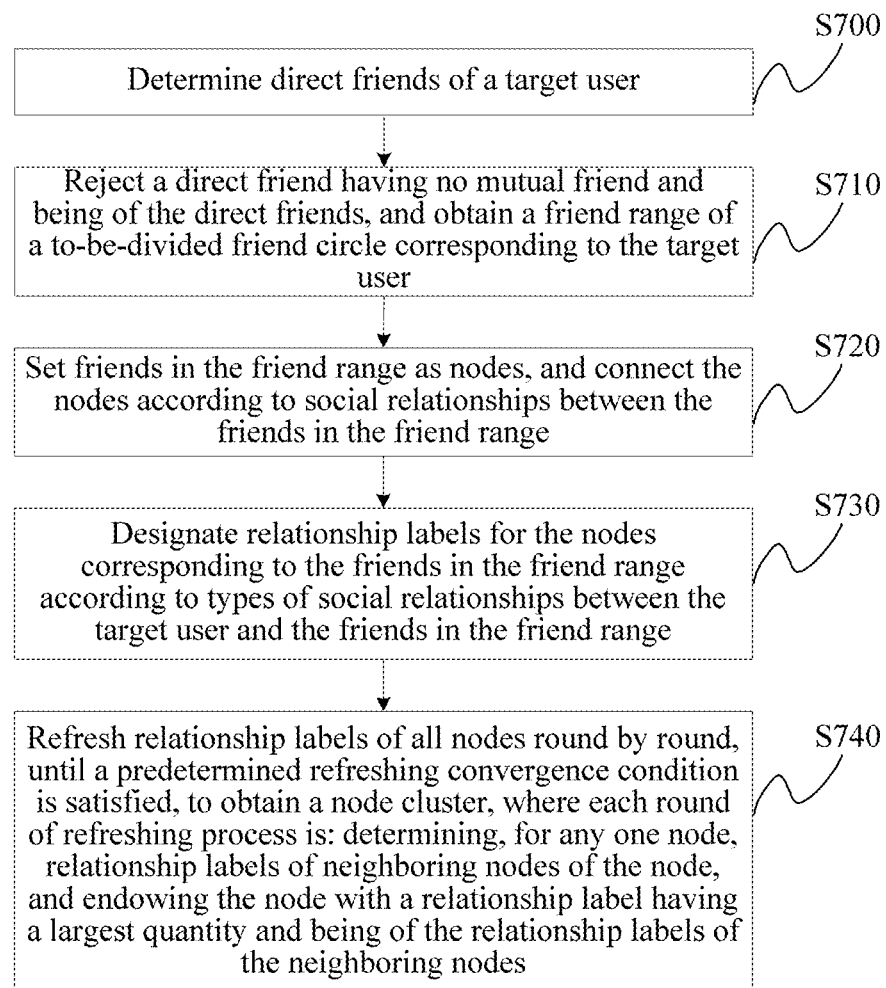
FIG. 9 is a flowchart of a method for determining a friend circle according to an embodiment.

FIG. 9 shows a process of a method for determining at least one friend circle of a target user according to an embodiment. The method may be performed by a server. Referring to FIG. 9, the method may include the following steps.

In step S700, the method may determine direct friends of a target user.

For example, friends having a one-level friend relationship with the target user may be determined according to a social relationship chain of the target user to obtain direct friends of the target user.

In step S710, the method may reject a direct friend having no mutual friend, and obtain a friend range of a to-be-divided friend circle corresponding to the target user.

After the direct friends of the target user are obtained, friends of the direct friends may also be obtained. A direct friend having no mutual friend with other direct friends of the target user may be rejected, and the method may further obtain a friend range of a to-be-divided friend circle of the target user. That is, the friend range does not include at least one direct friend of the direct friends of the target user that is rejected based on the direct friend having no mutual friend.

Figure 10:
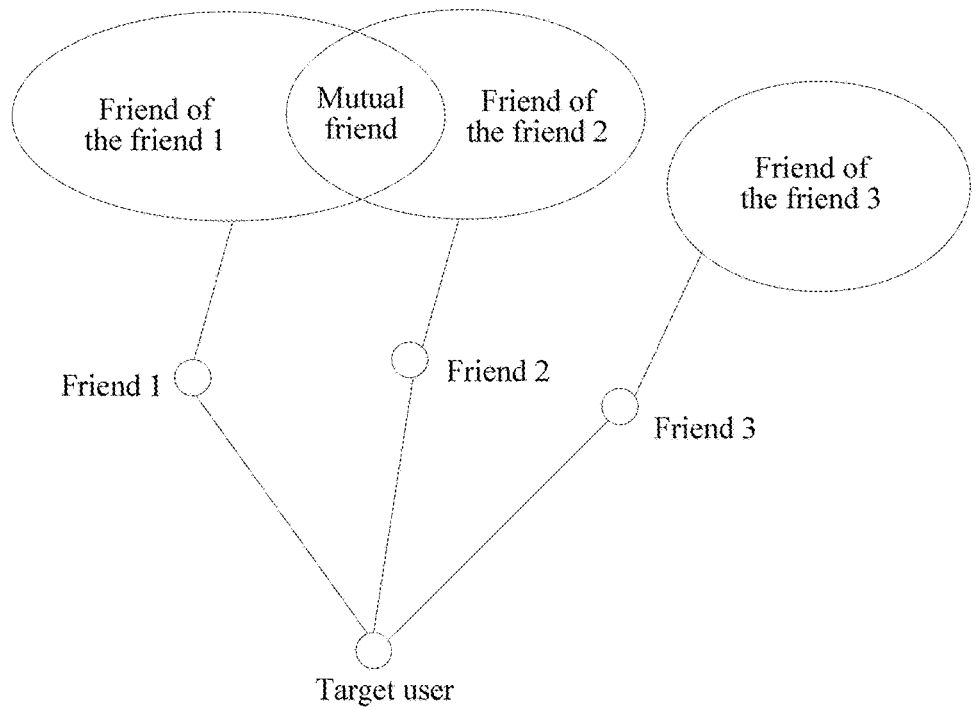
FIG. 10 is a diagram of an example of a direct friend having no mutual friend according to an embodiment.

For example, as shown in FIG. 10, direct friends of a target user include a friend 1, a friend 2, and a friend 3, where the friend 1 and the friend 2 have a mutual friend, while the friend 3 has no mutual friend with the friend 1 and the friend 2. Therefore, the friend 3 may be rejected, the direct friends 1 and 2 of the target user may be included in a friend range of a to-be-divided friend circle of the target user. A quantity of direct friends of the target user is not limited to three, but this is only an example description for ease of understanding the rejection of the direct friend of the target user having no mutual friend with other direct friends of the target user.

A friend range of a to-be-divided friend circle of the target user may be considered as having at least one friend on which friend circle division of the target user is to be performed and that is of the friends of the target user. According to an embodiment, friend circle division of the target user is performed mainly based on the friend range of the to-be-divided friend circle of the target user.

Furthermore, the foregoing manner is an implementation of determining a friend range of a to-be-divided friend circle corresponding to the target user. In addition to rejecting a direct friend of the target user having no mutual friend from the direct friends of the target user to obtain a friend range of a to-be-divided friend circle corresponding to the target user, another manner such as directly using direct friends of the target user as a friend range of a to-be-divided friend circle corresponding to the target user may alternatively be used. A friend range of a to-be-divided friend circle corresponding to the target user may be adjusted according to an actual case.

In step S720, the method may set friends in the friend range as nodes, and connect the nodes according to social relationships between the friends in the friend range.

After the friend range of a to-be-divided friend circle corresponding to the target user is obtained, each friend in the friend range may be defined as a node, and nodes may be connected based on a social relationship between each friend in the friend range.

In step S730, the method may further designate relationship labels for the nodes corresponding to the friends in the friend range according to types of social relationships between the target user and the friends in the friend range.

According to an embodiment, after the nodes of the friends in the friend range are connected, relationship labels for the nodes corresponding to the friends in the friend range may be designated according to types of social relationships between the target user and the friends in the friend range. That is, a relationship label of a node indicates a type of a social relationship between the target user and a friend in the friend range indicated by the node. For example, the social relationship type may be a relative relationship, such as spouse, father-son, or sister-in-law, or a society relationship, such as colleague, university classmate, or senior high school classmate.

In step S740, the method may refresh relationship labels of all nodes each round until a predetermined refreshing convergence condition is satisfied, to obtain a node cluster. Further, each round of refreshing process may include determining, for any one node, relationship labels of neighboring nodes of the node, and labeling the node with a relationship label having the largest quantity and being the relationship labels of the neighboring nodes.

Furthermore, the predetermined refreshing convergence condition may be that the relationship labels of the nodes do not change again after refreshing, or a fluctuation rate of the relationship labels of the nodes is less than a threshold after refreshing.

That is, the relationship labels of all nodes may be refreshed each round until the relationship labels of the nodes do not change again after refreshing, or until when a fluctuation rate of the relationship labels of the nodes is less than a threshold after refreshing. A round of refreshing process may include, for one refreshed node, relationship labels of neighboring nodes of the node may be determined, and the refreshed node is labeled with a relationship label having the largest quantity and being the relationship labels of the neighboring nodes.

Figure 11:
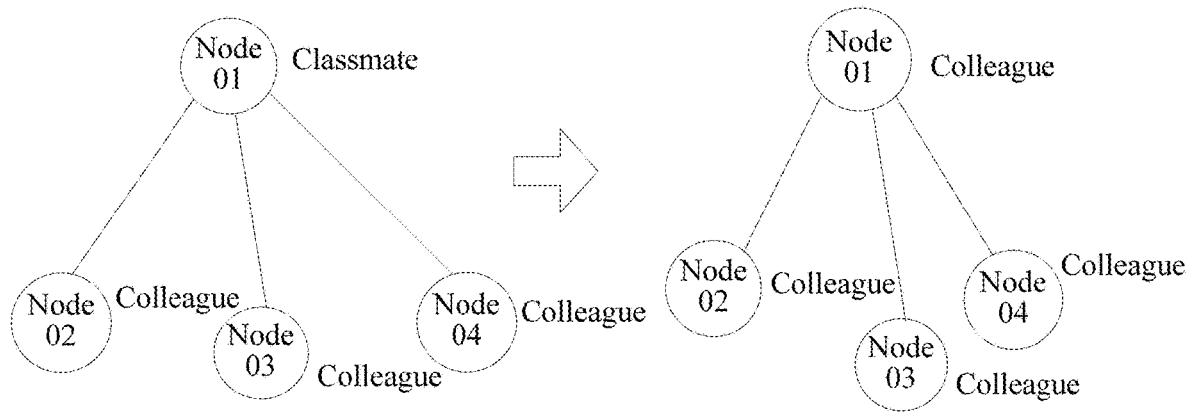
FIG. 11 is a schematic diagram of refreshing a relationship label of a node according to an embodiment.

For example, as shown in FIG. 11, a node 01 represents a classmate, a node 02 represents a colleague, a node 03 also represents another colleague, and a node 04 also represents yet another colleague. When the node 01 is refreshed, neighboring nodes 02, 03 and 04 of the node 01 may be refreshed, and it may be determined that a relationship label having the largest quantity and being the relationship labels of the neighboring nodes of the node 01 is a colleague, thereby labeling the node 01 with a relationship label of colleague. Each node may be refreshed in this manner, and looping may be performed until the relationship labels of the nodes do not change again after refreshing, or until when a fluctuation rate of the relationship labels of the nodes is less than a threshold after refreshing.

In step S750, the method may aggregate friends of the target user corresponding to nodes accumulated in the node cluster into a friend circle of the target user.

After the relationship labels of all of the nodes are refreshed until the predetermined refreshing convergence condition is satisfied, the node cluster may be obtained. As shown in FIG. 12, friends of a target user corresponding to nodes accumulated in a node cluster may be aggregated as a friend circle of the target user, thereby finding the friend circle of the target user.

Furthermore, after friend circles of the target user are determined, the friend circles of the target user may be classified so that types of the friend circles of the target user are determined. As such, for a friend circle in which a relatively large quantity of group chats are established, a name text of the group chats may be collected to classify the friend circle in a text classification manner.

FIG. 13 shows a process of friend circle classification, and the process may include the following steps.

In step S800, the method may determine, in friend circles of a target user, at least one first friend circle in which group chats are established for a quantity of times reaching a quantity threshold of times.

Specifically, for the friend circles of the target user, a quantity of times of establishing group chats by friends in the friend circles may be analyzed, thereby obtaining a quantity of times of establishing group chats in the friend circles of the target user. Then, a first friend circle in which group chats are established for a quantity of times reaching the quantity threshold of times may be determined according to the quantity of times of establishing group chats in the friend circles. For example, the first friend circle may be used to indicate a friend circle in which a quantity of times of establishing group chats reaches the quantity threshold of times and that is of the friend circles of the target user. In addition, the first friend circle quantity may be at least one.

In step S810, the method may determine, in group chats established in first friend circles, a group chat in which members of the first friend circle occupies a proportion greater than a predetermined proportion.

After the first friend circle is determined through step S800, a group chat in which members of the first friend circle occupy a proportion of group chat users greater than a predetermined proportion, and that is of the group chats established in the first friend circle, may be analyzed.

In step S820, the method may collect a name text of the determined group chat.

After the group chat in which members of the friend circle occupies a proportion greater than a predetermined proportion is determined in group chats established in friend circles, name text information of the group chat may be collected, so as to subsequently perform text classification processing.

In step S830, the method may perform text classification on the name text, and obtain a class of the first friend circle.

Specifically, text classification methods may include, but are not limited to, machine learning and depth learning methods, such as keyword classification, support vector machine (SVM) classification, and neutral network classification, and the like. For example, according to an aspect of an embodiment, text characteristics of friend circle classes may be preset, then matching process may be performed between a text characteristic of the name text of the determined group chat and the text characteristics of the friend circle classes, and a friend circle class having the highest matching level may be determined as a class of the first friend circle.

Furthermore, for a friend circle in which a relatively small quantity of group chats are established, the friend circle may not be classified based on a name text of the group chats. In such case, a friend circle class prediction model may be trained in advance, and a class of a friend circle of the target user may be predicted based on the friend circle class prediction model.

Figure 14:
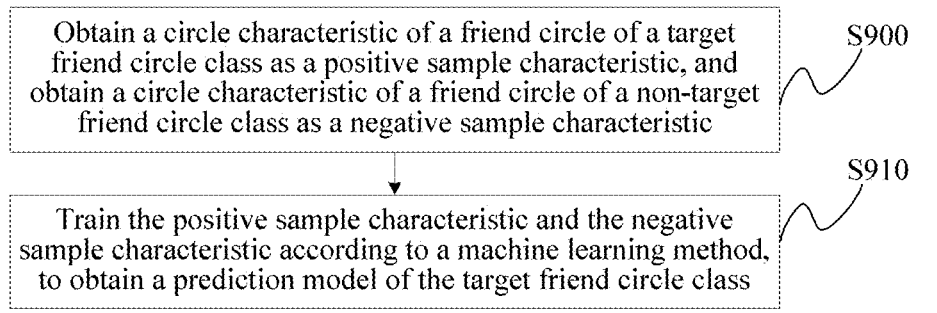
FIG. 14 is a flowchart of establishing a friend circle class prediction model according to an embodiment.

FIG. 14 shows a process of establishing a friend circle class prediction model.

In step S900, the method may obtain a characteristic of a friend circle of a target friend circle class as a positive sample characteristic, and obtain a characteristic of a friend circle of a non-target friend circle class as a negative sample characteristic.

The target friend circle class may be any one of friend circle classes, where the friend circle class may be a classmate circle, a colleague circle, a family circle, or the like. When a friend circle class prediction model that can predict the target friend circle class is trained, the circle characteristic of the friend circle of the target friend circle class may be obtained as a positive sample characteristic. A friend circle belonging to the target friend circle class may be implemented, through the method in FIG. 13, according to a name text of group chats established in the friend circle of the target friend circle class. That is, the friend circle belonging to the target friend circle class may be sorted out through the method in FIG. 13, according to the name text of the group chats established in the friend circle to obtain a positive sample, thereby using a circle characteristic of the friend circle belonging to the target friend circle class as the positive sample characteristic.

For example, circle characteristics may be basic characteristics of a member in a friend circle, such as age and gender, and circle interaction characteristics may be, for example, interaction characteristics between friends in a circle, including a voice quantity of friends in the circle, a quantity of mutual chat times, a quantity of evaluation times in moments, and the like.

Additionally, after a friend circle not belonging to the target friend circle class is sorted out through the name text of the group chats established in the friend circle, the friend circle of the non-target friend circle class sorted out may be used as a negative sample, and a circle characteristic of the friend circle of the non-target friend circle class may be used as a negative sample characteristic.

In step S910, the method may train the positive sample characteristic and the negative sample characteristic according to a machine learning method to obtain a prediction model of the target friend circle class.

According to an embodiment, any one of friend circle classes may be used as a target friend circle class, and prediction models of friend circle classes may be obtained according to the foregoing method.

After the prediction models of the friend circle classes are obtained, a circle characteristic of a friend circle of a to-be-determined friend circle class may be imported to the prediction models of the friend circle classes, thereby using a friend circle class having a maximum probability in prediction results as the friend circle class corresponding to the friend circle of the to-be-determined friend circle class.

Further, the application recommendation method provided may be used to recommend a game to a target user. As such, impacts of a friend of the user and a friend circle on registration of the target user in the game may be determined based on social information of the friend of the user and the registered game in the friend circle. A recommendation score of recommending the game to the user may be obtained, then according to the recommendation score, game recommendation and ranking may be performed in a plurality of games recommended to the user, and game recommendation may be performed for the user according to the ranked games.

According to an embodiment, the application recommendation method based on a social relationship of a user may be used. An application is recommended with reference to the social relationship of the user, so that application recommendation manners may be enriched, and a social advantage of an application, such as a game, may be effectively exerted. Recommendation performed through stimulation of a friend has more affinity, and relationship chain characteristic coverage may be wide, so that an application may be effectively recommended.

Figure 15:
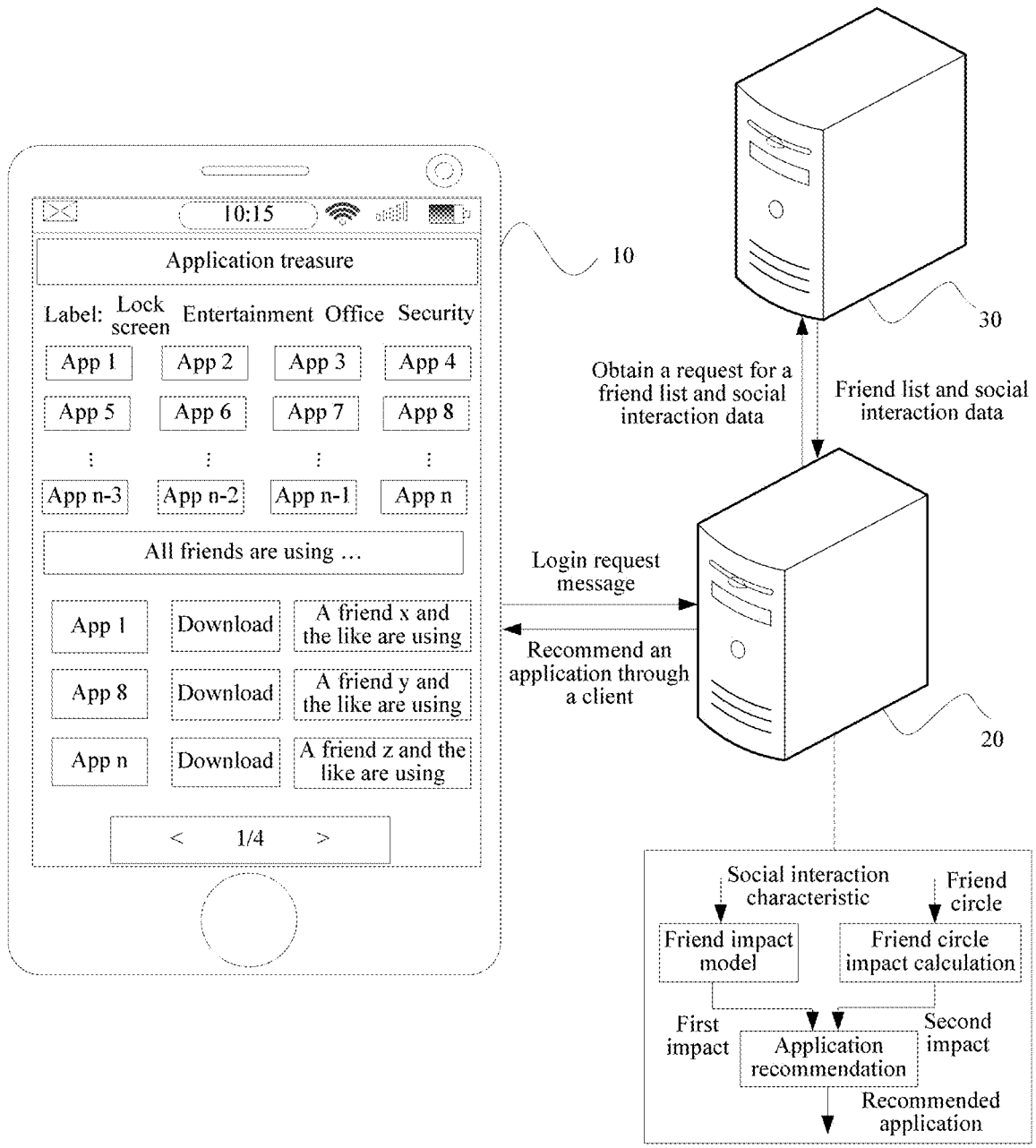
FIG. 15 is a schematic diagram of an application scenario of an application recommendation method according to an embodiment.

FIG. 15 is a schematic diagram of a scenario of an application recommendation method according to an embodiment. As shown in FIG. 15, the application scenario includes a client 10, a recommendation server 20, and a social server 30. The client 10 is an application program or application program function module for providing an application recommendation service to a user, for example, a plug-in. In a specific example, the client 10 may be an application program, such as "application treasure". The recommendation server 20 is a server for providing an application recommendation service to the user, and the server may be a server of the application downloading platform described above, for example, a server of the "application treasure". The social server 30 is a server for providing social interaction data of the user, and the social server 30 may be a server of the social application described above.

A specific implementation process may be that, the user opens the "application treasure", and logs in to an "application treasure" account. In an exemplary scenario, the user may log in to the "application treasure" account through a social application account number. For example, a "QQ account number" or a "WeChat number". In this way, the recommendation server 20 may obtain login information according to a login request message of the user, and determine, according to account information carried in the login information, the user corresponding to the account information as a target user.

After the target user is determined, the recommendation server 20 may obtain, from the social server 30, a friend list of the target user, and interaction data between the target user and friends. For example, the social server 30 may be a QQ or WeChat server. At least one target friend may be determined based on the friend list of the target user, and social interaction characteristics between the target user and target friends may be obtained according to the interaction data between the target user and the friends.

Then, the recommendation server 20 may determine, according to a pre-trained friend impact prediction model of a target application and social interaction characteristics between the target user and the target friends, first impacts of the target friends on registration of the target user in the target application, and then determine a sum of the impacts of the target friends. For example, if friend impact prediction models of 100 applications are trained in advance, first impacts of the target friends on registration of the target user in each application may be determined. For each application, first impacts of the target friends on registration of the target user in the application may be weighted and summated, to obtain a sum of impacts of the target friends on a friend having registered in the application.

Moreover, the recommendation server 20 may further determine at least one friend circle according to the friend list of the target user and the interaction data, including group chat data and the like, that are obtained from the social server 30. Based on the determined friend circle, the recommendation server 20 may determine friends having registered in the target application in the friends of the target user, determine a friend circle of the target user in which the friends having registered in the target application are located, determine a second impact of the friend circle on registration of the target user in the target application according to a quantity of the friends having registered in the target application in the friend circle and a quantity of friends in the friend circle, then add second impacts of the friend circles on registration of the target user in the target application, and obtain a sum of impacts of the friend circles on registration of the target user in the target application according to an addition result.

For each target application, the recommendation server 20 may add the sum of the impacts of the target friends and the sum of the impacts of the friend circles on registration of the target user in the target application, to obtain the recommendation score corresponding to the target user and the target application. For the target user, recommendation scores corresponding to target applications may be ranked, and then a top-ranked target application may be recommended to the target user. For example, recommendation scores corresponding to 100 target applications may be ranked in descending order, and target applications ranked at top 10 may be recommended to the target user through the client 10. As such, the user may view, through the client 10, the target applications recommended by the server, so as to determine whether to download the target application. As shown in FIG. 15, a current page of the client presents two application recommendation manners. One application recommendation manner may be to perform recommendation according to a label to which an application belongs, for example, office or entertainment. The other application recommendation manner may be to perform application recommendation based on a social relationship associated with an application. Specifically, the client may receive 10 applications, such as an application 1, an application 8 and an application n recommended by the recommendation server 20 according to the social relationship, where the current page displays three applications, such as the application 1, the application 8 and the application n. The other recommended applications may be viewed in a page flip manner. In some cases, the client 10 may further display friends that are currently using a recommended application, for example, a friend x that is using the recommended application 1, and a friend y that is using the recommended application 8.

According to an embodiment, an application recommendation method may be implemented based on an impact of a friend of a user on registration of the user in an application, so that less popular application may be found by the user because of recommendation based on a social relationship of the user, thereby increasing a probability that the recommended application may be downloaded by the user. In contrast, compared to an application recommendation implemented based on an interest of a user, the application recommendation made based on an impact of a friend may remedy a defect where a new user to an application cannot recommend the application because of insufficient application experience data. Thus, the present embodiment improves a probability that a recommended application may be downloaded by the user.

The foregoing is only an example of an application recommendation method, and does not constitute a limitation on the technical solutions of the present disclosure, and the application recommendation method provided herein may be further applied to another scenario.

According to an aspect of an embodiment, an application recommendation apparatus may include a program module that may be disposed in a server to implement the application recommendation method. The functions of the application recommendation apparatus described herein may be implemented through corresponding program functions in the server.

Figure 16:
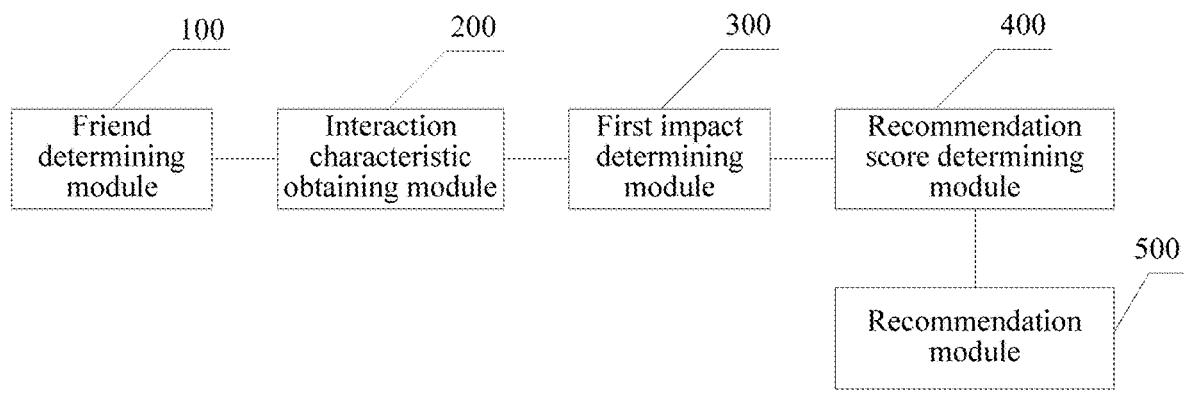
FIG. 16 is a structural block diagram of an application recommendation apparatus according to an embodiment.

FIG. 16 is a structural block diagram of an application recommendation apparatus according to an embodiment. The apparatus may be a server. Referring to FIG. 16, the apparatus may include a friend determining module 100 configured to determine at least one target friend in friends of a target user, an interaction characteristic obtaining module 200 configured to obtain social interaction characteristics between the target user and target friends, a first impact determining module 300 configured to determine, according to a pre-trained friend impact prediction model of a target application and social interaction characteristics between the target user and the target friends, first impacts of the target friends on registration of the target user in the target application, a recommendation score determining module 400 configured to determine a recommendation score of the target application corresponding to the target user according to the first impacts of the target friends on registration of the target user in the target application, and a recommendation module 500 configured to perform application recommendation according to the recommendation score.

Figure 17:
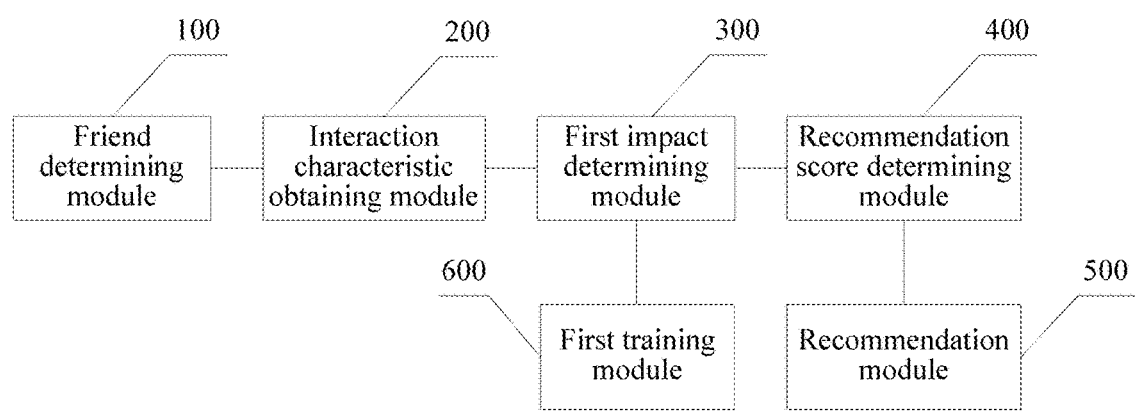
FIG. 17 is another structural block diagram of an application recommendation apparatus according to an embodiment.

FIG. 17 is another structural block diagram of an application recommendation apparatus according to an embodiment. With reference to FIG. 16 and FIG. 17, the apparatus may further include, a first training module 600 configured to sample a preset quantity of registration users from users having registered in a target application, select, for each registration user, a friend having registered in the target application from friends of the registration user as a positive sample, and select a friend having not registered in the target application as a negative sample, to obtain a positive sample and a negative sample corresponding to each registration user. The apparatus may further obtain, for each registration user, social interaction characteristics between the registration user and positive samples, to obtain positive sample characteristics corresponding to registration users. The apparatus may also obtain, for each registration user, social interaction characteristics between the registration user and negative samples, to obtain negative sample characteristics corresponding to registration users. Based on the obtained sample characteristics, the apparatus may train the positive sample characteristics and the negative sample characteristics corresponding to the registration users according to a machine learning algorithm to obtain the friend impact prediction model of the target application.

In addition, a social interaction characteristic between the target user and one target friend may include a quantity of social interaction behaviors belonging to a set social interaction behavior type between the target user and the target friend within a set interaction period.

The friend impact prediction model may include weights of set social interaction behavior types.

The first impact determining module 300 is configured to determine, according to a pre-trained friend impact prediction model of a target application and social interaction characteristics between the target user and the target friends, impacts of the target friends on registration of the target user in the target application. The first impact determining module may specifically include
combine, for each target friend of the target user, a quantity of social interaction behaviors belonging to a set social interaction behavior type between the target user and each target friend within a set interaction period with a weight of a corresponding social interaction behavior type indicated by the friend impact prediction model, and determine a first impact of the one target friend on registration of the target user in the target application according to a combination result.

Further, the recommendation score determining module 400 may be configured to determine a recommendation score of the target application corresponding to the target user according to the first impacts of the target friends on registration of the target user in the target application. The recommendation score determining module may specifically include determining a sum of impacts of the target friends according to the first impacts of the target friends on registration of the target user in the target application, and using the sum of the impacts of the target friends as a recommendation score corresponding to the target user and the target application.

Figure 18:
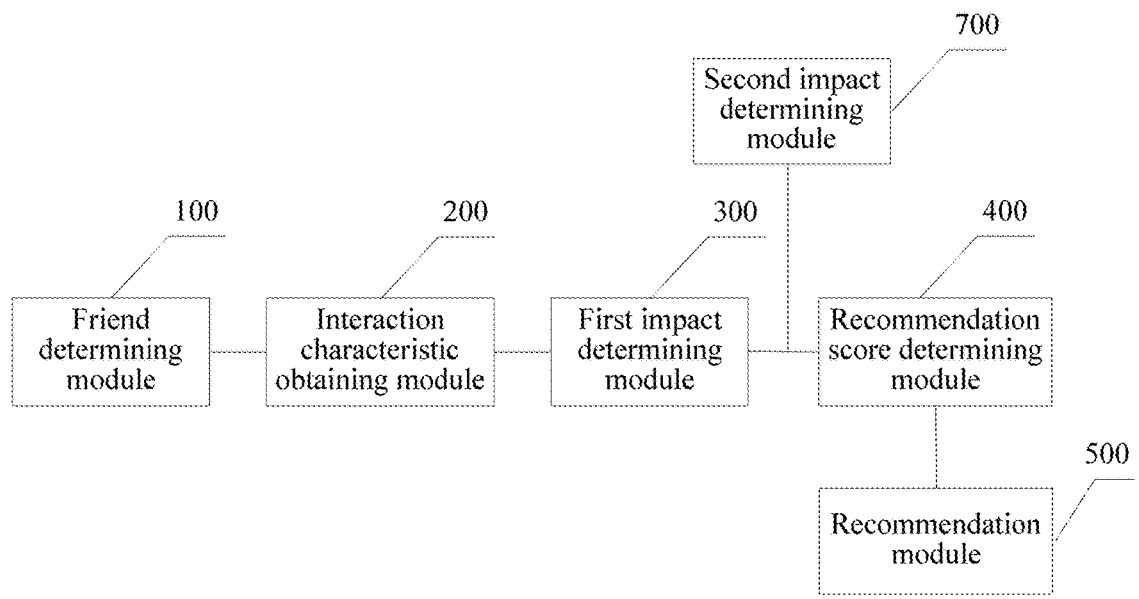
FIG. 18 is still another structural block diagram of an application recommendation apparatus according to an embodiment.

FIG. 18 is still another structural block diagram of an application recommendation apparatus according to an embodiment. With reference to FIG. 16 and FIG. 18, the apparatus may further include a second impact determining module 700 configured to determine at least one friend circle of the target user; and determine second impacts of friend circles on registration of the target user in the target application, and the recommendation score determining module 400 configured to determine a recommendation score of the target application corresponding to the target user according to the first impacts corresponding to the target friends. The recommendation score determining module 400 may specifically include determining a recommendation score of the target application corresponding to the target user according to the first impacts corresponding to the target friends and the second impacts of the friend circles on registration of the target user in the target application.

Additionally, the recommendation score determining module 400 may be configured to determine a recommendation score of the target application corresponding to the target user according to the first impacts of the target friends on registration of the target user in the target application and the second impacts of the friend circles on registration of the target user in the target application. The recommendation score determining module 400 may specifically include determining a sum of impacts of the target friends according to the first impacts of the target friends on registration of the target user in the target application; and determining a sum of impacts of the friend circles on registration of the target user in the target application according to the second impacts of the friend circles on registration of the target user in the target application, and adding the sum of the impacts of the target friends and the sum of the impacts of the friend circles on registration of the target user in the target application to obtain a recommendation score corresponding to the target user and the target application.

Further, the recommendation score determining module 400 may be configured to determine the sum of the impacts of the target friends according to the first impacts corresponding to the target friends, and may include adding, if the at least one target friend includes only a friend having registered in the target application of the friends of the target user, the first impacts of the target friends on registration of the target user in the target application, and obtaining the sum of the impacts of the target friends according to an addition result, or combining, if the at least one target friend includes a friend having registered in the target application and a friend having not registered in the target application, the first impacts of the target friends on registration of the target user in the target application with corresponding scoring thresholds, adding combination results, and obtaining the sum of the impacts of the target friends according to an addition result, where the scoring thresholds include a first value and a second value, the first value is a scoring threshold that is set for a target friend having registered in the target application, and the second value is a scoring threshold that is set for a target friend having not registered in the target application.

Furthermore, the recommendation score determining module 400 may be configured to determine a sum of impacts of the friend circles on registration of the target user in the target application according to the second impacts of the friend circles on registration of the target user in the target application. The recommendation score determining module 400 may specifically include adding the second impacts of the friend circles on registration of the target user in the target application, and obtaining the sum of the impacts of the friend circles on registration of the target user in the target application according to an addition result.

According to an embodiment, the second impact determining module 700 may be configured to determine at least one friend circle of the target user, and may specifically include determining direct friends of the target user, rejecting a direct friend having no mutual friend with the target user and being the direct friend of the target user, and obtaining a friend range of a to-be-divided friend circle corresponding to the target user, setting friends in the friend range as nodes, and connecting the nodes according to social relationships between the friends in the friend range, designating relationship labels for the nodes corresponding to the friends in the friend range according to types of social relationships between the target user and the friends in the friend range, and refreshing relationship labels of all nodes each round until a predetermined refreshing convergence condition is satisfied to obtain a node cluster, where each round of refreshing process includes determining, for any one node, relationship labels of neighboring nodes of the node, and labeling the node with a relationship label having a largest quantity and being of the relationship labels of the neighboring nodes.

In addition, the second impact determining module 700 may be configured to determine second impacts of friend circles on registration of the target user in the target application. The second impact determining module 700 may specifically include determining a friend having registered in a target application in friends of a target user, and determining a friend circle of the target user in which the friend having registered in the target application is located, where different friend circles are distinguished according to different friend circle classes, and determining, for any friend circle of the target user, a second impact of the friend circle on registration of the target user in the target application according to a quantity of friends in the friend circle having registered in the target application and a quantity of friends in the friend circle.

Figure 19:
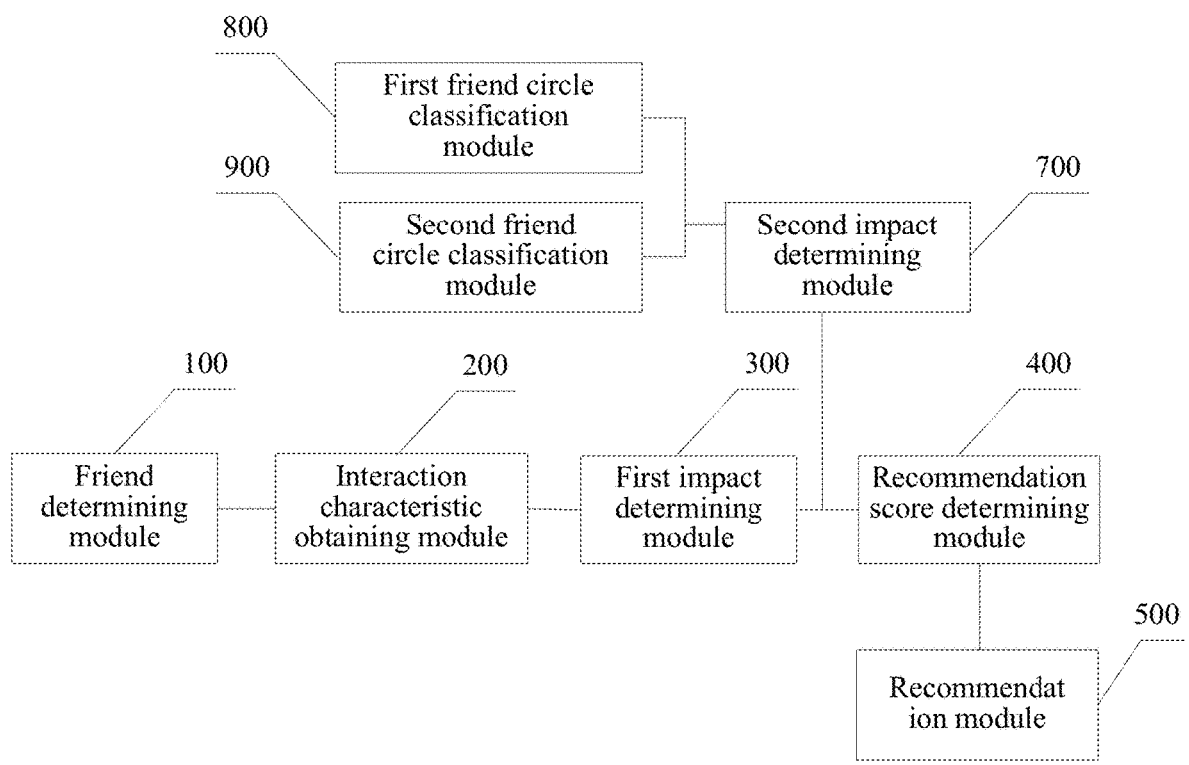
FIG. 19 is yet another structural block diagram of an application recommendation apparatus according to an embodiment.

FIG. 19 is yet another structural block diagram of an application recommendation apparatus according to an embodiment. With reference to FIG. 16 and FIG. 19, the apparatus may include a first friend circle classification module 800 configured to determine, in friend circles of a target user, at least one first friend circle in which group chats are established, for a quantity of times reaching a quantity threshold of times; determine, in group chats established in first friend circles, a group chat in which members of a first friend circle occupies a proportion greater than a predetermined proportion; collect a name text of the determined group chat; and perform text classification on the name text, and obtain a class of the first friend circle. A second friend circle classification module 900 may be configured to determine, according to pre-trained prediction models of friend circle classes and a circle characteristic of a friend circle of a to-be-determined friend circle class, prediction results of the prediction models of the friend circle classes, and determine a friend circle class having a maximum probability in the prediction results as a friend circle class of the friend circle, where a prediction model of one friend circle class may be obtained through training according to a circle characteristic of a friend circle of the friend circle class and a circle characteristic of a friend circle being not of the friend circle class.

In addition, the recommendation module 500 may be specifically configured to rank a plurality of target applications according to a recommendation score corresponding to the target user, and recommend, according to a ranking result, a top-ranked target application to the target user, or rank a plurality of target users according to a recommendation score corresponding to the target application, and recommend the target application to a target user ranked top according to a ranking result.

According to an embodiment, one of the first friend circle classification module 800 and the second friend circle classification module 900 may alternatively be used.

Referring back to FIG. 1, FIG. 1 shows a hardware structure of a server, and the server may include at least one memory and at least one processor, where the memory is configured to store a program, and the processor is configured to access the program stored in the memory. The program may include determining at least one target friend in friends of a target user, obtaining social interaction characteristics between the target user and target friends, determining, according to a pre-trained friend impact prediction model of a target application and the social interaction characteristics between the target user and the target friends, first impacts of the target friends on registration of the target user in the target application, determining a recommendation score corresponding to the target user and the target application at least according to the first impacts of the target friends on registration of the target user in the target application, and performing application recommendation according to the recommendation score.

Additionally, an embodiment of the present disclosure further provides a storage medium. The storage medium may be configured to store program code, and the program code may be used to perform the application recommendation method provided in the foregoing embodiment.

An embodiment of the present disclosure further provides a computer program product including instructions. When the computer program product is running on a server, the server may be caused to perform the application recommendation method provided in the foregoing embodiment.

It should be noted that the embodiments of the disclosure are all described in a progressive manner. Description of each of the embodiments focuses on differences from other embodiments, and reference may be made to each other for the same or similar parts among respective embodiments. The apparatus embodiments are substantially similar to the method embodiments, and reference may be made to the method embodiments for the associated part.

A person skilled in the art may further realize that, in combination with the embodiments herein, units and algorithm, steps of each example described may be implemented with electronic hardware, computer software, or the combination thereof. In order to describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art may use different methods to implement the described functions for each particular application, but it should be noted that the implementation goes beyond the scope of the embodiments described herein.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present disclosure. The general principles defined in the present disclosure may be implemented in other embodiments without departing from the core idea and scope of the present disclosure. Therefore, the present disclosure is not limited to the embodiments disclosed in the present disclosure, but needs to conform to the broadest scope consistent with the principles and novel features disclosed in the present disclosure.

What is claimed is:

1. An application recommendation method, the method being performed by a server, and the method comprising:
    determining at least one target friend among a plurality of friends of a target user;
    obtaining social interaction characteristics between the target user and the at least one target friend;
    based on a pre-trained friend impact prediction model of a target application and the social interaction characteristics between the target user and the at least one target friend, determining a first impact of the at least one target friend on registration of the target user in the target application;
    determining at least one friend circle of the target user;
    determining a second impact of the at least one friend circle on the registration of the target user in the target application;
    determining a recommendation score corresponding to the target user and the target application according to the first impact of the at least one target friend and the second impact of the at least one friend circle on registration of the target user in the target application; and
    performing application recommendation according to the recommendation score,
    wherein the method further comprises:
    determining, for the at least one friend circle, whether a quantity of group chats established exceeds a predetermined threshold;
    determining, in the group chats established in the at least one friend circle, a group chat in which members of the at least one friend circle occupies a proportion greater than a predetermined proportion; and
    obtaining a name text of the determined group chat, performing text classification on the name text, and obtaining a class of the at least one friend circle based on the classified name text.

2. The application recommendation method according to claim 1, further comprising:
    sampling a preset quantity of a plurality of registration users from users having registered in the target application;
    selecting, among the preset quantity of registration users, a friend registered with the target application as a positive sample, and selecting a friend not registered with the target application as a negative sample;
    obtaining, for each one of the plurality of registration users, positive sample characteristics based on social interaction characteristics between one of the plurality of registration users and at least one positive sample;
    obtaining, for each one of the plurality of registration users, negative sample characteristics based on social interaction characteristics between the one of the plurality of registration users and at least one negative sample; and
    training the positive sample characteristics and the negative sample characteristics corresponding to the plurality of registration users according to a machine learning algorithm, to obtain the pre-trained friend impact prediction model of the target application.

3. The application recommendation method according to claim 1, wherein the social interaction characteristic between the target user and the at least one target friend comprises:
    obtaining a set of social interaction behavior types; and
    determining a quantity of social interaction behaviors based on the set of social interaction behavior types within a set interaction period.

4. The application recommendation method according to claim 3, wherein the pre-trained friend impact prediction model determines weights for each one of the set social interaction behavior types, and
    wherein the determining the first impact further comprises:
    combining, for the at least one target friend of the target user, the quantity of social interaction behaviors belonging to the set of social interaction behavior types with the weights corresponding to the social interaction behavior types; and
    determining the first impact of the at least one target friend on the registration of the target user in the target application.

5. The application recommendation method according to claim 1, wherein the determining the recommendation score further comprises:
    determining a first sum of impacts of the target friends by summing a plurality of first impacts of the target friends on the registration of the target user in the target application; and
    using the first sum of impacts of the target friends as the recommendation score corresponding to the target user and the target application.

6. The application recommendation method according to claim 5, wherein the determining the first sum of impacts of the target friends further comprises:
    based on the at least one target friend being a friend registered in the target application, adding the plurality of first impacts of the target friends on registration of the target user in the target application, and obtaining the first sum of the impacts of the target friends; or
    based on the at least one target friend being a friend registered in the target application and a friend not registered in the target application, combining the plurality of first impacts of the target friends on registration of the target user in the target application corresponding to scoring thresholds, and adding the combined result to obtain the first sum of the impacts of the target friends, wherein the scoring thresholds comprise a first value and a second value, the first value is set for the target friend registered in the target application, and the second value is set for the target friend not registered in the target application.

7. The application recommendation method according to claim 1, wherein the method further comprises:
  determining a first sum of impacts of the target friends according to the first impacts of the target friends on the registration of the target user in the target application and a second sum of impacts according to the second impact of the at least one friend circle on the registration of the target user in the target application; and
  adding the first sum of the impacts and the second sum of the impacts to obtain the recommendation score corresponding to the target user and the target application.

8. The application recommendation method according to claim 7, wherein the determining the second sum of impacts of the friend circles further comprises:
  adding a plurality of the second impacts of the friend circles on registration of the target user in the target application, and obtaining the second sum of the impacts of the friend circles on registration of the target user in the target application.

9. The application recommendation method according to claim 1, wherein the determining at least one friend circle of the target user comprises:
  determining direct friends of the target user;
  rejecting a direct friend having no mutual friend, and obtaining a friend range of a to-be-divided friend circle corresponding to the target user;
  setting friends in the friend range as nodes, and connecting the nodes according to social relationships between the direct friends in the friend range;
  designating relationship labels for the nodes corresponding to the direct friends in the friend range according to the social interaction characteristics between the target user and the direct friends in the friend range; and
  refreshing relationship labels of all nodes each round until a predetermined refreshing convergence condition is satisfied, to obtain a node cluster, wherein each round of refreshing process determines, for any one node, relationship labels of neighboring nodes of the node, and designating the node with a relationship label having a largest quantity.

10. The application recommendation method according to claim 1, wherein the determining the second impact of the at least one friend circle on registration of the target user in the target application further comprises:
  determining a friend registered in the target application in the at least one target friend of the target user, and determining the friend circle of the target user in which the at least one target friend having registered in the target application is located; and
  determining, for any one of a plurality of friend circles of the target user, the second impact of the friend circle on the registration of the target user in the target application according to a quantity of friends in the friend circle and a quantity of friends in the friend circle having registered in the target application, wherein the one of the plurality of friend circles is distinguished from the other one of the plurality of friend circles based on a friend circle class.

11. The method according to claim 1, wherein the performing application recommendation according to the recommendation score comprises:
  ranking a plurality of target applications according to the recommendation score corresponding to the target user, and recommending, according to an application ranking result, a top-ranked target application to the target user; or
  ranking a plurality of target users according to the recommendation score corresponding to the target application, and recommending the target application to a top-ranked target user according to a user ranking result.

12. A non-transitory computer readable storage medium, storing executable instructions, the executable instructions capable of causing a computer to perform the application recommendation method according to claim 1.

13. An application recommendation apparatus, comprising:
  at least one memory configured to store computer program code; and
  at least one processor configured to access the computer program code comprising:
    friend determining code configured to cause the at least one processor to determine at least one target friend among a plurality of friends of a target user;
    interaction characteristic obtaining code configured to cause the at least one processor to obtain social interaction characteristics between the target user and the at least one target friend;
    first impact determining code configured to cause the at least one processor to determine, based on a pre-trained friend impact prediction model of a target application and social interaction characteristics between the target user and the at least one target friend, a first impact of the at least one target friend on registration of the target user in the target application;
    first friend circle classification code configured to cause the at least one processor to determine at least one friend circle of the target user;
    second impact determining code configured to cause the at least one processor to determine a second impact of the at least one friend circle on the registration of the target user in the target application;
    recommendation score determining code configured to cause the at least one processor to determine a recommendation score corresponding to the target user and the target application according to the first impact of the at least one target friend and the second impact of the at least one friend circle on the registration of the target user in the target application; and
    recommendation code configured to cause the at least one processor to perform application recommendation according to the recommendation score,
  wherein the computer program code further comprises:
  second friend circle classification code configured to cause the at least one processor to:
    determine, for the at least one friend circle, whether a quantity of group chats established exceeds a predetermined threshold;
    determine, in the group chats established in the at least one friend circle, a group chat in which members of the at least one friend circle occupies a proportion greater than a predetermined proportion; and obtain a name text of the determined group chat, perform text classification on the name text, and obtain a class of the at least one friend circle based on the classified name text.

14. The application recommendation apparatus according to claim 13, wherein the interaction characteristic obtaining code is further configured to cause the at least one processor to:
   obtain a set of social interaction behavior types; and
   determine a quantity of social interaction behaviors based on the set of social interaction behavior types within a set interaction period.

15. An application recommendation server, comprising:
   at least one memory configured to store computer program code; and
   at least one processor configured to access the at least one memory and operate according to the computer program code comprising:
   friend determining code configured to cause the at least one processor to determine at least one target friend among a plurality of friends of a target user;
   interaction characteristic obtaining code configured to cause the at least one processor to obtain social interaction characteristics between the target user and the at least one target friend;
   first impact determining code configured to cause the at least one processor to determine, based on a pre-trained friend impact prediction model of a target application and the social interaction characteristics between the target user and the at least one target friend, a first impact of the at least one target friend on registration of the target user in the target application;
   first friend circle classification code configured to cause the at least one processor to determine at least one friend circle of the target user;
   second impact determining code configured to cause the at least one processor to determine a second impact of the at least one friend circle on the registration of the target user in the target application;
   recommendation score determining code configured to cause the at least one processor to determine a recommendation score corresponding to the target user and the target application according to the first impact of the at least one target friend and the second impact of the at least one friend circle on the registration of the target user in the target application; and
   recommendation code configured to cause the at least one processor to perform application recommendation according to the recommendation score,
   wherein the computer program code further comprises:
   second friend circle classification code configured to cause the at least one processor to:
      determine, for the at least one friend circle, whether a quantity of group chats established exceeds a predetermined threshold;
      determine, in the group chats established in the at least one friend circle, a group chat in which members of the at least one friend circle occupies a proportion greater than a predetermined proportion; and
      obtain a name text of the determined group chat, perform text classification on the name text, and obtain a class of the at least one friend circle based on the classified name text.

16. The application recommendation server according to claim 15, wherein the interaction characteristic obtaining code is further configured to cause the at least one processor to:
   obtain a set of social interaction behavior types; and
   determine a quantity of social interaction behaviors based on the set of social interaction behavior types within a set interaction period.

* * * * *